(12) United States Patent
Van Toorenburg et al.

(10) Patent No.: US 8,024,151 B2
(45) Date of Patent: *Sep. 20, 2011

(54) MOBILE INSTRUMENT, VIEWING DEVICE, AND METHODS OF PROCESSING AND STORING INFORMATION

(75) Inventors: Leon Lammers Van Toorenburg, Wellington (NZ); Mark Eric James Prentice, Newton (NZ); Craig Richard Bond, Newtown (NZ); Graham Leslie Mann, Te No (NZ)

(73) Assignee: Surveylab Group Ltd., Wellington (NZ)

( * ) Notice: Subject to any disclaimer, the term of this patent is extended or adjusted under 35 U.S.C. 154(b) by 271 days.

This patent is subject to a terminal disclaimer.

(21) Appl. No.: 12/238,834

(22) Filed: Sep. 26, 2008

(65) Prior Publication Data

US 2009/0082991 A1 Mar. 26, 2009

Related U.S. Application Data

(62) Division of application No. 10/522,291, filed on Aug. 24, 2005, now Pat. No. 7,647,197.

(30) Foreign Application Priority Data

Sep. 8, 2002 (NZ) .................................... 520687
Jul. 8, 2003 (WO) .................... PCT/NZ03/000174

(51) Int. Cl.
*G09G 5/00* (2006.01)
(52) U.S. Cl. ...................................................... 702/150
(58) Field of Classification Search .............. 702/60–63, 702/150–154, 158; 382/199, 286; 356/124, 356/124.5
See application file for complete search history.

(56) References Cited

U.S. PATENT DOCUMENTS

| 5,528,518 | A | 6/1996 | Bradshaw et al. |
| 5,539,513 | A | 7/1996 | Dunne |

(Continued)

FOREIGN PATENT DOCUMENTS

EP 0 661519 B1 7/1995

(Continued)

OTHER PUBLICATIONS

Fadi Chehimi, Paul Coulton, and Reuben Edwards, Using a Camera Phone as aMixed-Reality Laser Cannon, Hindawi Publishing Corporation, International Journal of Computer Games Technology, vol. 2008, Article ID 321708, 6 pages doi:10.1155/2008/321708, p. 1-6.*

*Primary Examiner* — Tung S Lau
(74) *Attorney, Agent, or Firm* — Husch Blackwell LLP

(57) ABSTRACT

A method of transferring information stored in a mobile instrument, the information including a first information file (140) containing metadata and a pointer indicative of a first auxiliary file address; and a first auxiliary file (141) containing image information, the first auxiliary file being located at the first auxiliary file address. The method includes the steps of: storing the metadata in a second information file (140'); storing the image information in a second auxiliary file (142') at a second auxiliary file address; generating a second pointer indicative of the second auxiliary file address; and storing the second pointer in the second information file. The instrument includes a camera (70); one or more spatial sensors; and an external sensor port (56). Power to the sensors can be controlled asynchronously. Various parsing methods are also described. The instrument includes a marker module configured to superimpose a marker on the image.

14 Claims, 23 Drawing Sheets

U.S. PATENT DOCUMENTS

| | | | |
|---|---|---|---|
| 5,612,779 A | 3/1997 | Dunne | |
| 5,652,651 A | 7/1997 | Dunne | |
| 5,696,705 A | 12/1997 | Zykan | |
| 5,703,678 A | 12/1997 | Dunne | |
| 5,740,037 A * | 4/1998 | McCann et al. | 700/90 |
| 5,742,113 A | 4/1998 | Loucks | |
| 5,780,999 A | 7/1998 | Dunne | |
| 5,781,147 A | 7/1998 | Elliott et al. | |
| 5,806,020 A | 9/1998 | Zykan | |
| 5,859,693 A | 1/1999 | Dunne et al. | |
| 5,880,821 A | 3/1999 | Dunne | |
| 5,889,583 A | 3/1999 | Dunne | |
| 5,926,260 A | 7/1999 | Dunne et al. | |
| 5,940,172 A | 8/1999 | Ball | |
| 5,949,529 A | 9/1999 | Dunne et al. | |
| 6,040,897 A | 3/2000 | Clifford et al. | |
| 6,043,868 A | 3/2000 | Dunne | |
| 6,057,777 A | 5/2000 | Dunne et al. | |
| 6,057,910 A | 5/2000 | Dunne | |
| 6,064,330 A | 5/2000 | Elliott et al. | |
| 6,064,942 A * | 5/2000 | Johnson et al. | 701/213 |
| 6,073,352 A | 6/2000 | Zykan et al. | |
| 6,108,071 A | 8/2000 | Landry et al. | |
| 6,141,091 A | 10/2000 | Ball | |
| 6,144,308 A | 11/2000 | Dunne | |
| 6,226,077 B1 | 5/2001 | Dunne | |
| 6,236,448 B1 * | 5/2001 | Ota | 355/53 |
| 6,236,938 B1 | 5/2001 | Atkinson et al. | |
| 6,282,803 B1 | 9/2001 | Dunne | |
| 6,339,468 B1 | 1/2002 | Clifford et al. | |
| 6,377,186 B1 | 4/2002 | Dunne et al. | |
| 6,587,644 B2 * | 7/2003 | Takase et al. | 396/149 |
| 6,628,406 B1 * | 9/2003 | Kreuzer | 356/508 |
| 6,934,461 B1 * | 8/2005 | Strub et al. | 386/46 |
| 6,952,881 B2 * | 10/2005 | McGivern | 33/265 |
| 7,061,523 B2 * | 6/2006 | Fujita et al. | 348/77 |
| 2002/0052709 A1 * | 5/2002 | Akatsuka et al. | 702/153 |
| 2010/0091112 A1 * | 4/2010 | Veeser et al. | 348/207.1 |

FOREIGN PATENT DOCUMENTS

| | | |
|---|---|---|
| GB | 9810405.2 | 5/1998 |
| GB | 9823463.6 | 10/1998 |
| GB | 9920460.4 | 8/1999 |
| JP | 4152284 A2 | 5/1992 |
| JP | 5072486 A2 | 3/1993 |
| JP | 5158887 A2 | 6/1993 |
| JP | 8088825 A2 | 4/1996 |
| JP | 8129216 A2 | 5/1996 |
| JP | 8184436 A2 | 7/1996 |
| JP | 8184892 A2 | 7/1996 |
| JP | 8190145 A2 | 7/1996 |
| JP | 9037203 A2 | 2/1997 |
| JP | 9101142 A2 | 4/1997 |
| JP | 9135416 A2 | 5/1997 |
| JP | 10023398 A2 | 1/1998 |
| JP | 10157623 A2 | 6/1998 |
| JP | 10239055 A2 | 9/1998 |
| JP | 2000083276 A2 | 3/2000 |
| JP | 2001091253 A2 | 4/2001 |
| JP | 2001119721 A2 | 4/2001 |
| JP | 2001120042 A2 | 5/2001 |
| JP | 2001128052 A2 | 5/2001 |
| JP | 2001169164 A2 | 6/2001 |
| JP | 2001343213 A2 | 12/2001 |
| WO | WO 90/00567 | 1/1990 |
| WO | WO 90/12330 | 10/1990 |
| WO | WO 96/05479 | 2/1996 |
| WO | WO 96/22509 | 7/1996 |
| WO | WO 98/10984 | 3/1998 |
| WO | WO 98/54896 | 12/1998 |
| WO | WO 99/31516 | 6/1999 |
| WO | WO 99/57695 | 11/1999 |
| WO | WO 99/60335 | 11/1999 |
| WO | WO 9956079 A1 | 11/1999 |
| WO | WO 00/25089 | 5/2000 |
| WO | WO 01/71647 A1 | 9/2001 |
| WO | WO 02/33955 A2 | 4/2002 |

* cited by examiner

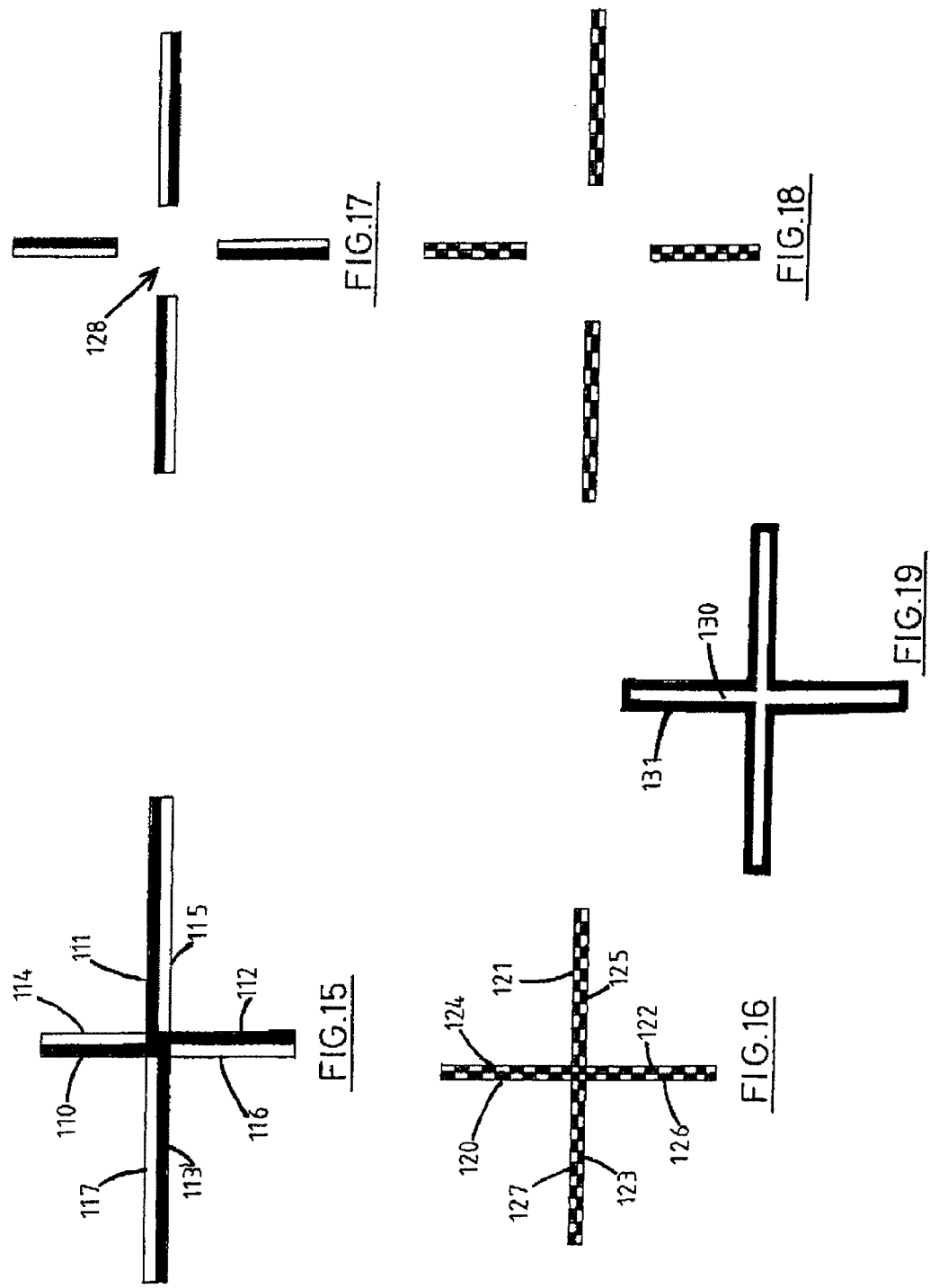

MOBILE INSTRUMENT, VIEWING DEVICE, AND METHODS OF PROCESSING AND STORING INFORMATION

This application is a divisional patent application of U.S. patent application Ser. No. 10/522,291, filed on Aug. 24, 2005 (now pending), herein incorporated by reference.

FIELD OF INVENTION

The invention relates to various improvements relating to the acquisition, processing, and/or transferring of information, typically for surveying or similar purposes. The information typically includes image information and spatial information. The spatial information may include distance information, global position information and/or orientation information. The invention is typically, although not exclusively, implemented in a mobile instrument. The invention also relates to a viewing device which provides a marker superimposed on the viewed image.

BACKGROUND OF INVENTION

Instruments are known which combine a digital camera and distance meter or range finder such as a laser range finder, and which are intended to be hand held or tripod or monopod mounted in use. Such instruments may also be associated with a GPS receiver and a compass, in order to record when an image of a subject is taken by the camera, the position of the camera or person operating the camera, the direction in which the camera is aimed, the distance to the subject or target, and the inclination to the subject or target. See for example www-.mdl.co.uk.

SUMMARY OF INVENTION

A first aspect of the invention provides a method of processing and storing information in a mobile instrument, the method including: receiving metadata; storing the metadata in an information file in the mobile instrument; receiving image information from a camera; storing the image information in an auxiliary file at an auxiliary file address in the mobile instrument; generating a pointer indicative of the auxiliary file address; and storing the pointer in the information file.

The first aspect enables the image information and metadata to be stored in the mobile instrument in different file formats, whilst retaining a link between the image information and the metadata (in the form of the pointer). It also enables the metadata to be linked with one or more further items of information (such as further images, or sound data). In this case the method further includes receiving further information; storing the further information in one or more further auxiliary files at one or more further auxiliary file addresses; generating one or more further pointers each indicative of a respective further auxiliary file address; and storing the further pointer(s) in the information file.

The metadata may be any data which is desirable to record and associate with the image information. For instance the metadata may be time/date information; input information received from a human user; or spatial metadata such as distance, global position and/or orientation information.

The image information from the camera may be still or moving image information.

A potential problem with the method of the first aspect of the invention is that the pointer may no longer be valid when the auxiliary file is moved to a different file address.

Accordingly, a further aspect of the invention provides a method of transferring information stored in a mobile instrument, the information including a first information file containing metadata and a pointer indicative of a first auxiliary file address; and a first auxiliary file containing image information, the first auxiliary file being located at the first auxiliary file address, the method including the steps of: storing the metadata in a second information file; storing the image information in a second auxiliary file at a second auxiliary file address; generating a second pointer indicative of the second auxiliary file address; and storing the second pointer in the second information file.

A further aspect of the invention provides a method of obtaining information including: acquiring image information from a camera; acquiring input information from a human user; acquiring spatial metadata from a spatial sensor; and associating the image information with the input information and the spatial metadata.

This aspect of the invention enables a user to input information in the field shortly before or after acquiring the image information. The input information enables the survey data to be categorised, filed and searched. The information may be input by speaking into a microphone, via a keypad or touch-sensitive screen, or by any other human input device.

The spatial metadata may be any spatial data of use in a surveying programme. For instance the spatial metadata may relate to the position and/or orientation of the camera (such as its tilt, azimuth bearing and/or inclination bearing), or may relate to the relative distance between the camera and an object in its field of view.

A further aspect of the invention provides a mobile instrument including: a camera; one or more spatial sensors; and a port able to be connected, when in use, to an external sensor from which the instrument may obtain further information.

The external sensor port can be used to obtain further information from an external sensor which is not integrated with the instrument. This minimises the size and weight of the instrument, whilst allowing flexibility. The external sensor can then be disconnected after use. The external sensor may be connected physically or via a wireless link.

A further aspect of the invention provides a method of operating a mobile instrument, the instrument including two or more measuring devices, the measuring devices including a camera and one or more spatial sensors: the method including asynchronously controlling the supply of power to at least two of the measuring devices.

This aspect of the invention minimises power consumption by ensuring that each device is only turned on when necessary. This aspect of the invention also provides a mobile instrument including: two or more measuring devices including a camera and one or more spatial sensors; a first power switch operable to control power to one or more first ones of the measuring devices; a second power switch to control power to one or more second ones of the measuring devices; and a power controller capable of asynchronously operating the first and second power switches.

A further aspect of the invention provides a viewing device for providing an image of a field of view, the device including a marker module configured to superimpose a marker on the image, the marker including a plurality of image elements including a first element, and a second element having visual content which contrasts with the first element.

This aspect of the invention provides a marker which is visible against a variety of background images. The first element contrasts with some portions of the background image, and the second element contrasts with other portions.

This ensures that at least one of the elements is visible, regardless of the content of the background image.

The invention is of use in a variety of viewing devices, including but not limited to a distance or angle measuring device, or a rifle sighting device.

The elements may radiate from a common central region (for instance a cross or star shape). However preferably the lines do not intersect at the common central region, whereby the image can be viewed in the central region.

Typically the elements are arranged in an alternating pattern, such as a random pattern or a chequerboard pattern.

In preferred embodiments the marker is superimposed electronically on a digital image, and the marker module is implemented in software. However the invention may be useful in a device in which the marker is provided as a reticle located in the focal plane of the viewer (for instance black and white markings printed onto a lens of an analog camera or rifle sight).

A further aspect of the invention provides an instrument including two or more sensors; two or more identical generic parsers; and two or more description files, each containing description data describing an associated sensor, wherein each generic parser is configured to receive sensor information from a respective sensor and description data from a respective description file, parse the sensor information in accordance with the description data to generate parsed sensor information, and output the parsed sensor information.

The two sensors are typically selected from the group consisting of a camera, distance meter, global position sensor, and orientation sensor (such as an electronic compass).

A further aspect of the invention provides an instrument including two or more sensors; two or more identical request interpreters; and two or more description files, each containing description data describing an associated sensor, wherein each request interpreter is configured to receive a request relating to a respective sensor, interpret the request in accordance with the description data to generate an interpreted request, and output the interpreted request to its respective sensor.

The two sensors are typically selected from the group consisting of a camera, distance meter, global position sensor, and orientation sensor (such as an electronic compass).

A further aspect of the invention provides a mobile instrument including: a camera and a distance meter mounted within a body of the instrument, a mirror pivotally mounted within the body of the instrument and towards which the camera and distance meter are directed, and adjustment means enabling a user to pivotally move the mirror to alter the aim angle of the camera and distance meter from the instrument together, without moving the body of the instrument.

The following comments apply to all aspects of the invention.

The sensors and camera are typically all integrated into a single mobile instrument.

That is, the instrument has a body, and the camera and sensors are carried in or on the body. Typically the instrument is a handheld instrument.

In the preferred embodiments the mobile instrument includes an electronic compass arranged to indicate to a central processing and data recording system of the instrument the compass direction in which the camera is aimed, a GPS receiver arranged to indicate to the central processing and data recording system the position of the instrument.

In the preferred embodiments the instrument has a dedicated laser distance meter (LDM) for measuring relative distance between the instrument and a target. However, it will be appreciated that instead of using a dedicated LDM, relative distance may be measured by using a pair of spaced cameras, and measuring distance on stereoscopic principles, as described in U.S. Pat. No. 6,083,353. In this case, the image information and the distance information are both acquired by the pair of cameras. Therefore the term "distance meter" referred to in the claims should be construed accordingly.

A similar principle can be applied to the GPS sensors. That is, instead of having a GPS sensor for measuring position, and an electronic compass for measuring orientation (for instance azimuth and inclination of the device), the position and orientation could be acquired using three spaced-apart GPS sensors. The term "orientation sensor" should be construed herein accordingly.

BRIEF DESCRIPTION OF THE DRAWINGS

The invention is further described with reference to the accompanying figures which illustrate two preferred forms of instrument by way of example and without intending to be limiting. In the figures:

FIGS. 15-19 show different crosshair patterns.

DETAILED DESCRIPTION OF PREFERRED FORMS

Referring to FIGS. 1 to 4, an instrument according to a first embodiment of the invention combines a digital camera module 30, distance meter module 31, electronic compass module 36 and GPS receiver module 37 as a single integrated unit.

Figure 2:
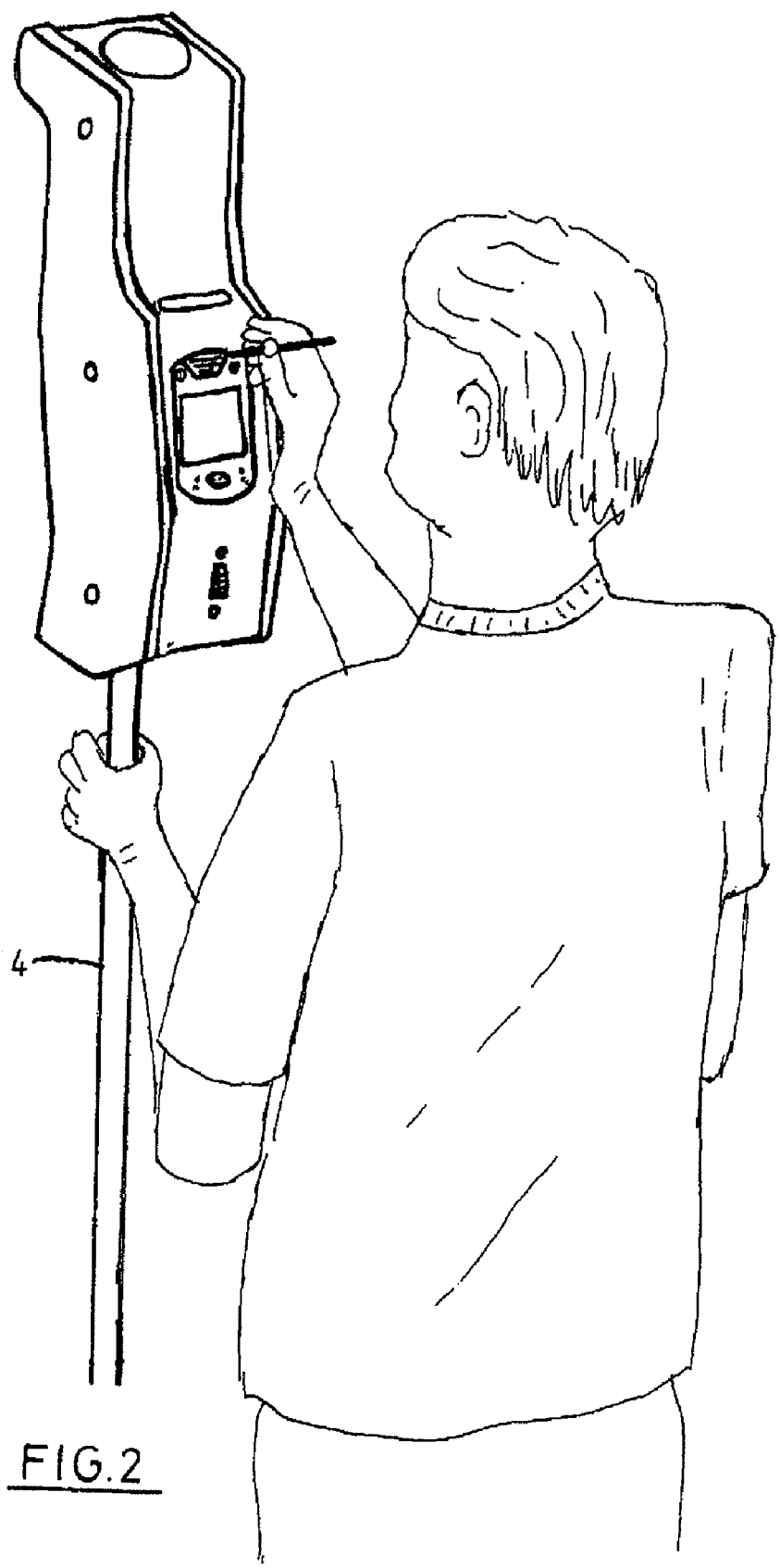
FIG. 2 shows use of the instrument by a user.
Figure 3:
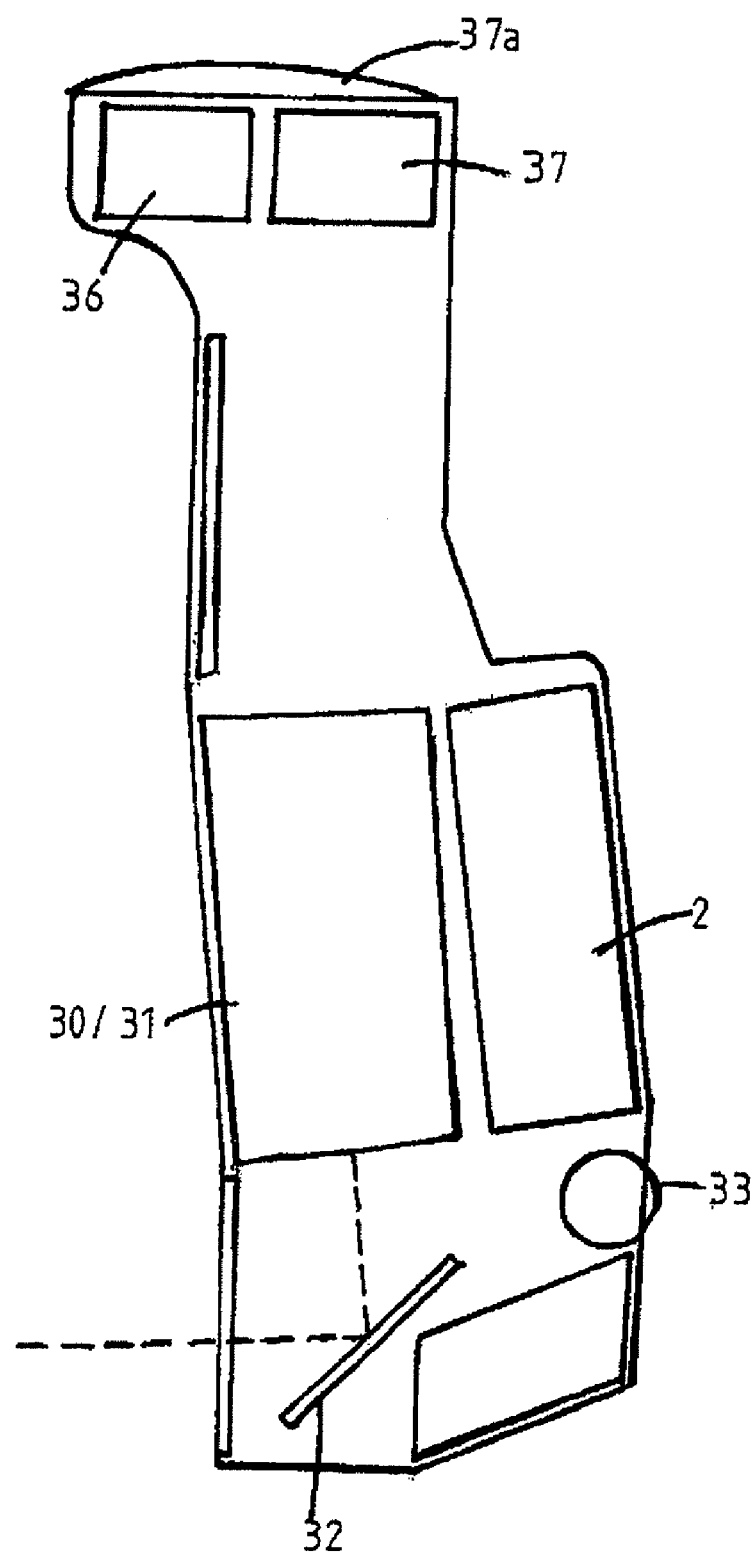
FIG. 3 is a schematic cross-section through the instrument.
Figure 4:
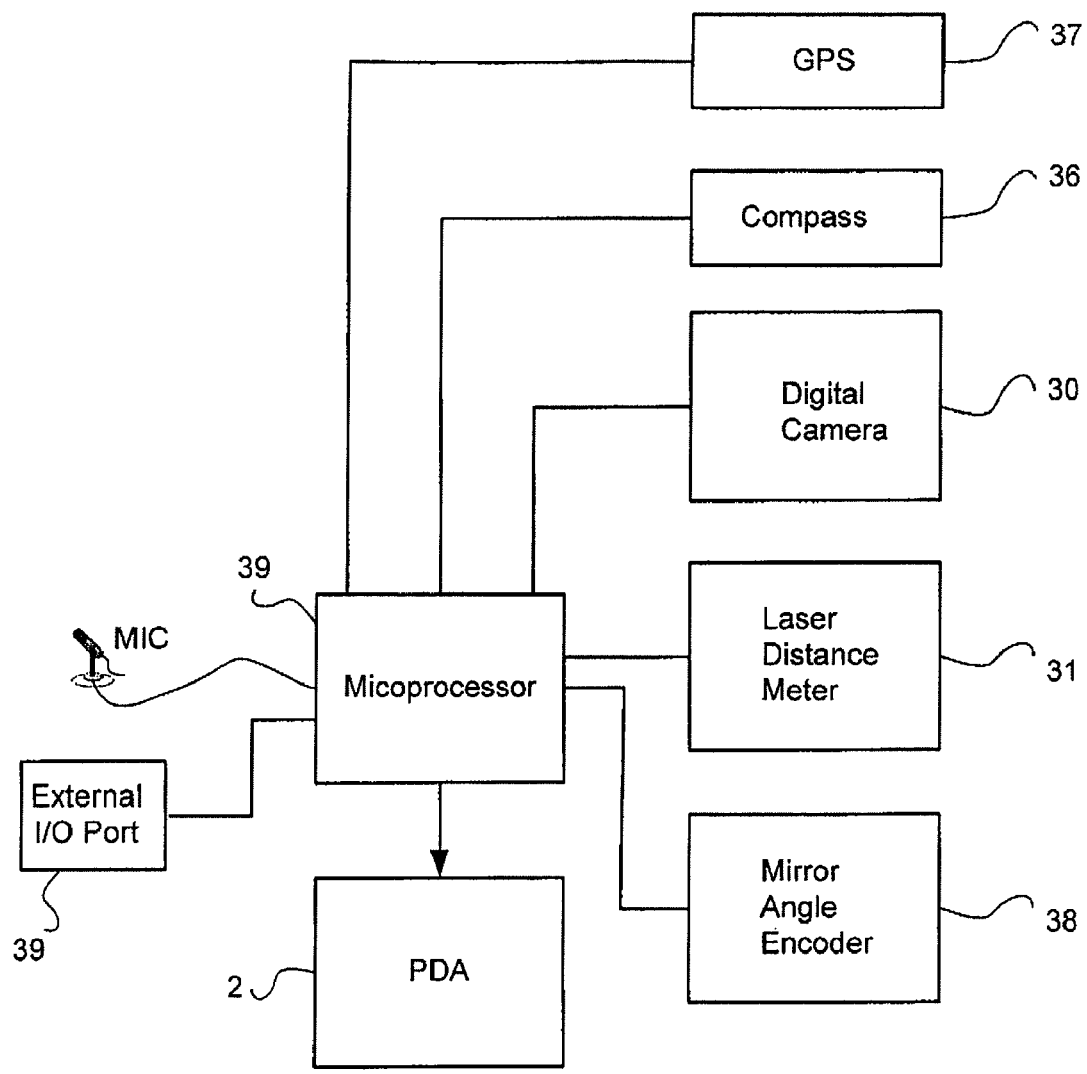
FIG. 4 is a basic block diagram showing the major parts of the instrument.
Figure 5:
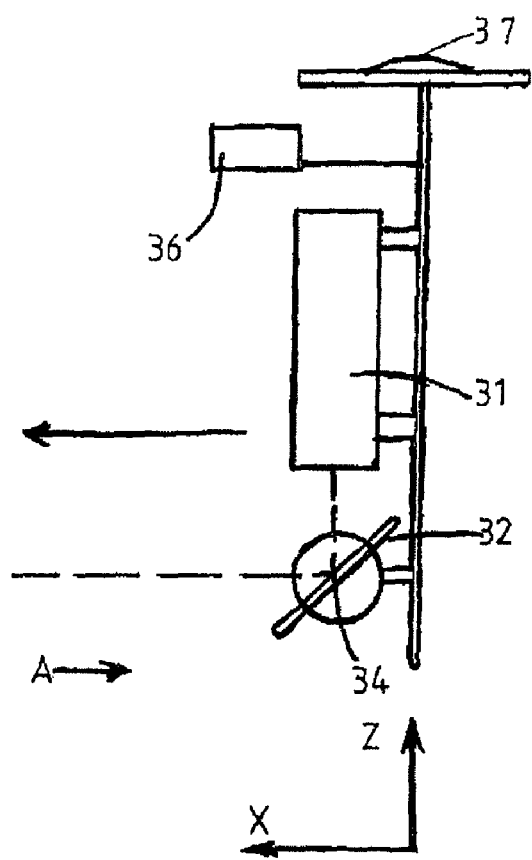
FIG. 5 schematically shows the camera and distance meter modules and aiming mirror within the body of the instrument from one side.
Figure 6:
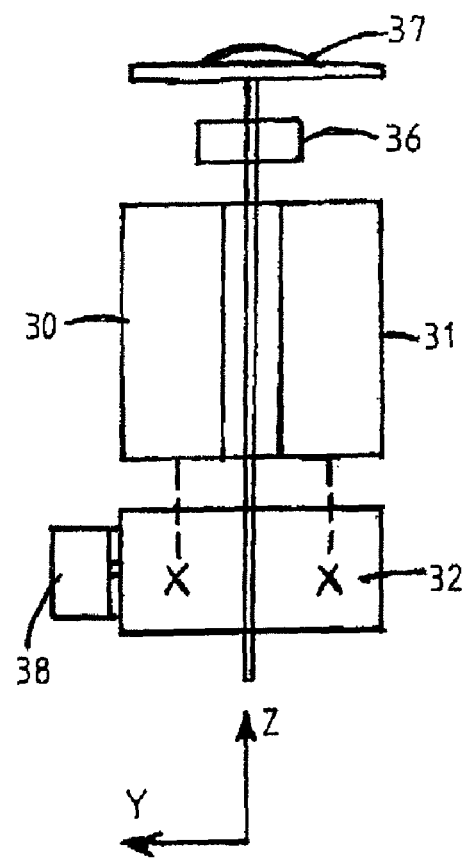
FIG. 6 shows the camera and distance modules and aiming mirror in the direction of arrow A in FIG. 5.

The instrument is intended to be hand held in the field as shown in FIG. 2, or may be tripod or monopod mounted. The instrument includes a central processing and data recording system which controls and integrates the functions of the sensor modules. When the instrument is aimed at a subject and an image taken the instrument as well as recording the digital image records the position of the instrument via the GPS receiver module 37, and the direction (azimuth and elevation) and distance from the instrument to the subject. When one or more images are subsequently downloaded from the instrument to be recorded or manipulated on a PC for example, associated with each image is a metafile of this data. Thus image processing or manipulation software such as ESRI's ArcGIS suite may calculate the position of the subject as well as having an image of the subject.

The subject may be a natural geographic feature, a man-made feature such as a building or pylon or similar, a tree etc, where it is desired to record an image and information on the subject for survey purposes. Alternatively the instrument may be used for recording a series of images at a crime or accident scene for example. The series of images taken by a user moving around the scene and the information associated with each image may be used to reconstruct a 3D virtual scene replicating the crime or accident scene or a part of the scene. Alternatively the instrument may be used to record an image of cables or pipes or similar in the ground or in any other situation, before an access hole is filled in, and the metafile associated with the image will record the exact position of the cables or pipes.

The instrument comprises a body 1 which preferably houses the modules of the instrument as a single integrated unit. In the preferred form the body 1 also mounts a PDA 2 such as an iPAQ™ device, which receives and stores the metafile information associated with each image taken. The display screen of the PDA also displays the target towards which the instrument is directed and thus provides a viewfinder aim function, and settings of the instrument are controlled through the PDA. Alternatively the PDA 2 may be a purpose designed computing platform that has portions of the sensor modules integrated into it.

Within the body 1 of the unit, mounted to a frame or similar within the interior of the unit are the camera and laser distance meter modules 30 and 31. The output laser of the distance meter 31 is directed towards a mirror 32 which is pivotally mounted within the body of the instrument as shown, so that the mirror directs the laser from a windowed aperture in the body of the instrument through which the laser and camera are directed. The camera 30 is also directed towards the mirror 32, so that a subject towards which the camera and laser distance meter are targeted will be recorded by the camera when an image is taken using the instrument.

To shift the aim of the instrument in a vertical plane it is not necessary for the whole instrument itself to be reoriented by the user. Typically where an instrument is hand held, the user looking through a view finder of the instrument must tilt the whole instrument up or down as well as tilting the users head at the same time. In the instrument of the invention the mirror 32 is pivotally mounted and, adjustment means is provided enabling the user to pivotally move the mirror to alter the aim angle of the camera and distance meter from the instrument together, without moving the body of the instrument.

Figure 1:
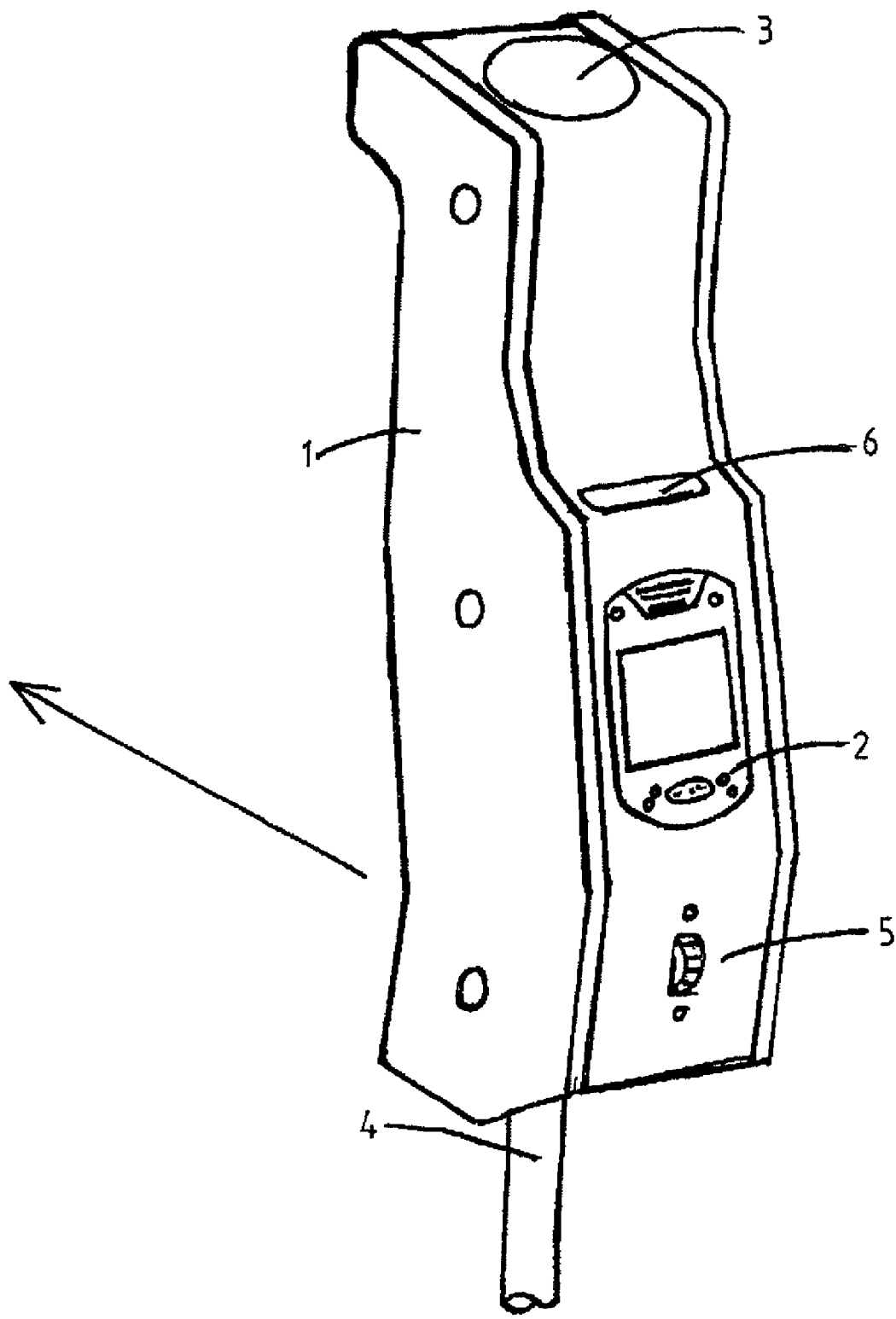
FIG. 1 shows a first instrument from the exterior.

An adjustment wheel 33 is provided which is mechanically coupled to an axle 34 pivotally mounting the mirror, and a peripheral portion of the adjustment wheel 33 is exposed through an aperture 35 in the body of the instrument. The adjustment wheel is positioned so that it can be moved by a thumb of a user holding the instrument in two hands. In use the instrument is held vertically on a monopod 4 as shown in FIGS. 1 and 2 for example, and adjustments in the aim of the instrument in the vertical plane can be made by adjusting the position of the mirror 32 via the thumb wheel 33.

In an alternative form instead of being directly coupled to the mirror axis 34 the thumb wheel or other form of adjuster may be coupled via a gear or gears to provide finer adjustment for example. Alternatively the angular position of the mirror may be varied by an electric motor coupled to the mirror 32 or a mounting system for the mirror, which is in turn controlled via a thumb wheel or any other suitable control means such as an up-down rocker button or similar.

The coupling between the adjustment wheel and the mirror may optionally include a slip clutch arrangement so that when the mirror reaches its stop the adjustment wheel may still move, but provide tactile feedback to the user that the mirror has stopped moving.

The instrument also incorporates an electronic compass 36 and a GPS receiver 37 which includes a GPS dome 37a in the top of the body of the instrument, and a central processing and data recording system which records the position of the instrument and direction and distance to the subject when an image is taken. A rotation angle meter 38 is coupled to the mirror axis 34 to indicate to the control system the angular position of the mirror relative to a known reference plane.

While the preferred form instrument combines a camera, distance meter, electronic compass, and GPS receiver, in a simpler form the instrument may combine simply a camera and distance meter. The mirror 32 is used to deflect the aim of the camera and laser distance meter towards the subject.

The electronic compass 36 employs a magnetic field sensor to measure the earth's magnetic field strength in the plane of the sensor. If the sensor is tilted then the change in the magnetic field measurement will depend on the global position of the instrument, as the direction of the earth's magnetic field changes over the globe, (vertical at the magnetic poles, horizontal in-between them). The component of the earth's magnetic field useful for navigation purposes is the projection of the vector onto the plane tangent to the earth's surface. Therefore if the electronic compass has only one sensor, then the compass must be kept precisely in the horizontal plane. The provision of a tilting mirror 32 enables the instrument to be kept in the horizontal plane.

However by combining three magnetic field sensors and two inclinometers in the compass 36, a tilt compensated compass bearing can be found. To automatically account for the tilt of the compass 36, and the varying slope of the magnetic field, three magnetic field sensors may be arranged to measure in the x, y and z direction, thereby finding the direction in space of the magnetic field sensor. The compass platform's deviation from level is found by a pair of inclination sensors aligned with the compass x and y sensors. An example of such a compass is AOSI's EZ-Tilt 3, http://www.aositilt.com/Compass.htm.

Although three field sensor compasses such as the AOSI's EZ-Tilt 3 do not require the compass to be horizontal, the use of a mirror 32 is still advantageous, as the compass still has best performance when horizontal or near horizontal. All the other sensors in the compass just compensate for tilt, so if their input can be reduced, by constraining the allowable tilt, then the compass will perform better. Also, tilt sensors provide best results around a certain point, usually associated with level. Their output quality degrades as the angle increases.

In summary, in the instrument of FIGS. 1-6 the camera, distance meter and compass are aligned so that they point in the same direction, and vertical angle deflection is achieved by rotating the mirror on the mirror axle axis. The change of vertical deflection is twice the mirror angle by virtue of the laws of reflection.

The geometry of the device must allow for the mirror to fully reflect the views of the distance meter and camera for all mirror angles.

Viewfinder aim function maybe achieved by looking at the output of the digital camera on the control computer.

The digital camera 30 can provide a fast succession of images, allowing real-time viewing of the target to the control computer screen. It can also capture a single frame for the computer. The digital picture, being precisely aligned and calibrated with the other sensors, has the same attributes as the laser distance meter—azimuth bearing, inclination, GPS position.

As the camera is viewing the subject through a mirror, the output picture will be reversed in one axis. In the configuration shown, it is top-bottom reversed. This can be corrected in the camera, or in the control software.

The mirror angle meter measures the angle of the mirror with respect to the frame. The angle meter maybe set up so that it outputs an angle of zero degrees when the output beam is horizontal, and the mounting frame is plumb. The deflected angle will be twice mirror movement angle.

The compass, which is fixed to the frame, must be located so that any material that distorts the earth's magnetic field has the least effect on the compass, or are fixed in place so that their impact may be minimised by the compass's internal hard and soft iron calibration routines.

The compass measures the earths magnetic field in the x, y and z axis. It also measures the compass platform deviation from plumb in the x and y axis. The tilt measurement combined with the three sensor compass measurement provides an accurate compass bearing even for a non-level compass board. The raw platform tilt measurements provide information for electronically levelling the device.

The GPS receiver 37 measures the position of the instrument. The accuracy of the GPS receiver may be enhanced using differential systems. The reference of the GPS receiver is the phase centre of the GPS antenna.

The microprocessor 39 is connected to all of the measurement devices and polls the sensors for data. It also displays an electronic viewfinder to facilitate aiming of the device.

When the device is aimed at the target, a 'measure' button 6 is pressed and the control computer takes the following data from all the sensors:
  Position of the Unit (GPS)
  Distance (Laser Distance Meter)
  Azimuth bearing (Electronic tilt compensated compass)
  Mirror Angle
  Platform tilt from plumb (Tilt sensors on compass)
  Digital picture of target
  Time/date of measurement These measurements, along with calibration coefficients from manufacture, are processed to provide the location of the target, and a picture. The processed data, and if required the raw data, is stored in the control computer's memory, possibly in a GIS database.

Optionally the instrument may be arranged to take a series of images or video of a subject, and record the data for the video segment or for each frame of the image series.

The instrument may also be configured to record audio information via a microphone, such as a sound byte or audio annotation from the user, to accompany the image or images and metafile information.

The instrument also includes a port 39 for connection of another external device from which the instrument may obtain further information and append additional information to the metafile information associated with each image or image series.

Figure 7:
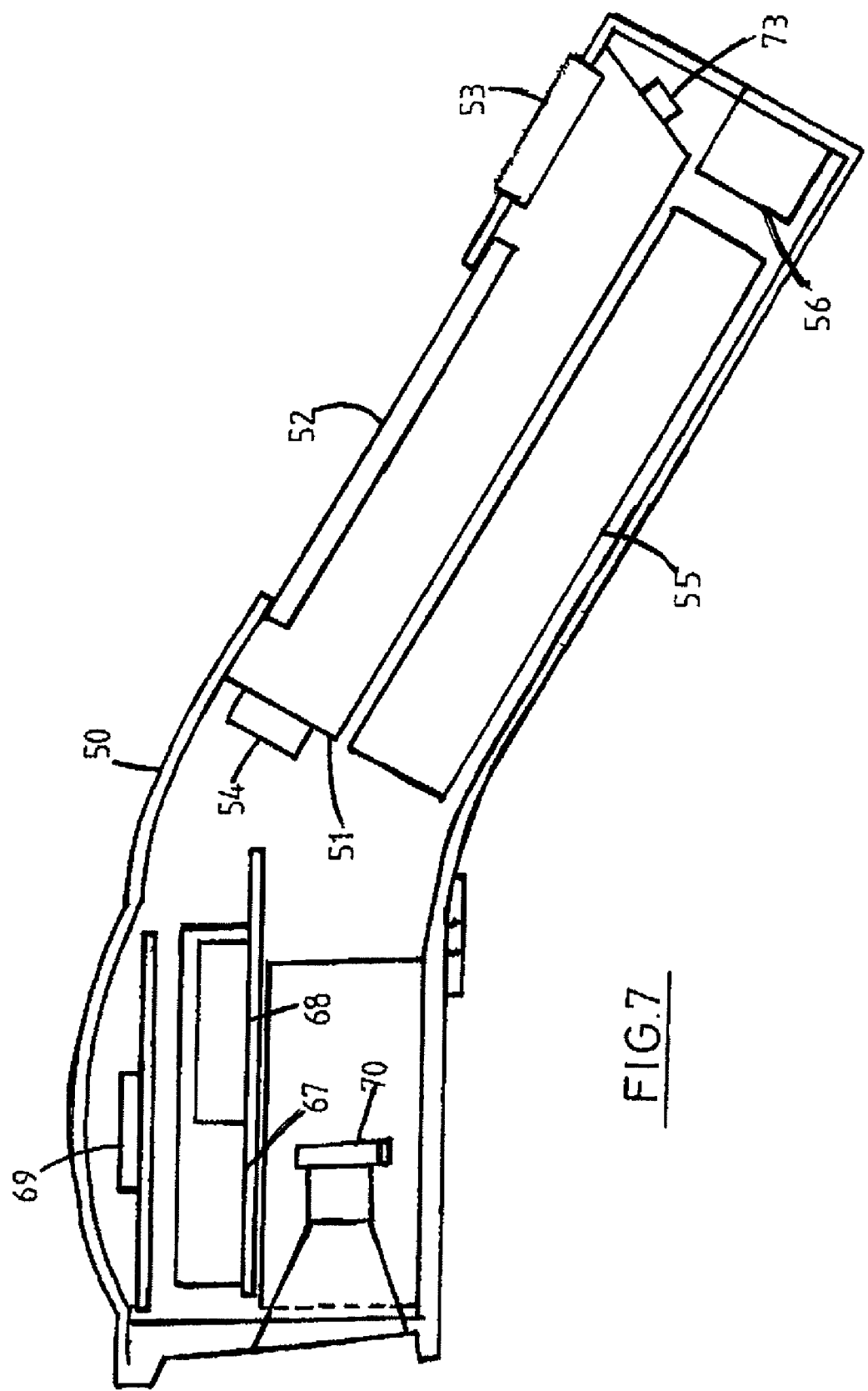
FIG. 7 shows a second instrument from the exterior.
Figure 8:
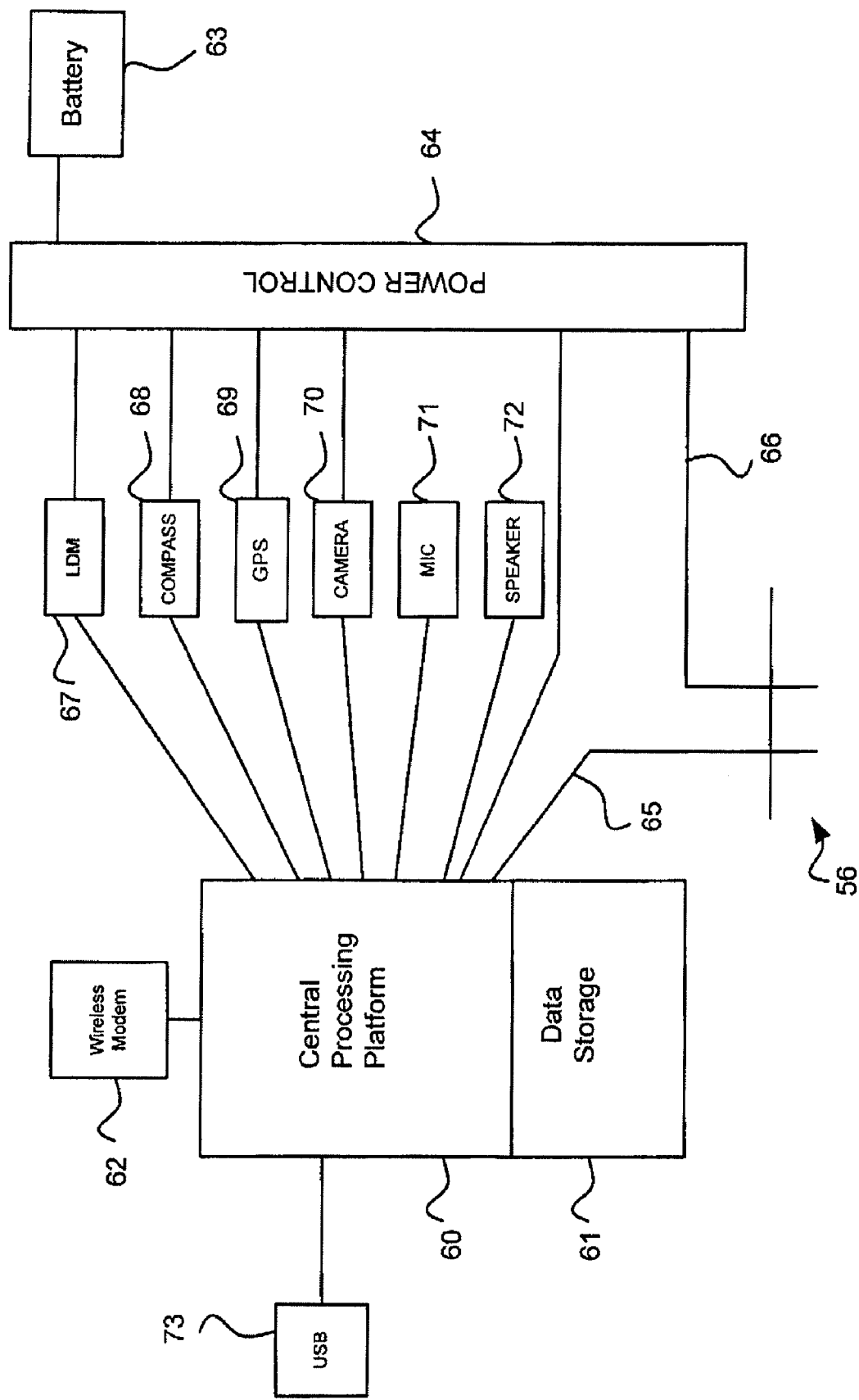
FIG. 8 is a basic block diagram showing the major parts of the second instrument.

An instrument according to a second embodiment of the invention is shown in FIGS. 7 and 8. The connections between the components are omitted in FIG. 7 for clarity, but are shown in FIG. 8. The instrument has a housing 50 which contains an IPaq™ PDA 51 with a touch-sensitive display screen 52, keypad 53, antenna 54 and USB port 73. The PDA 51 includes a central processing platform 60 shown in FIG. 8, data storage 61, and wireless modem 62 (for controlling the antenna 54). A power supply and control module 55 (shown in FIG. 7) includes a battery 63, and power control circuitry 64 (shown in FIG. 8). An external I/O port 56 includes a socket (not shown) for receiving a cable connected to an external device. The external I/O port is coupled to an RS232 serial data line 65 and a power line 66 (shown in FIG. 8). This allows the recording of information from a sensor not integrated contained in the housing 50, for example a depth sounder, pH meter, thermometer etc. The port 56 may be replaced by an alternative physical port (such as a USB) or by a wireless connection (such as a Bluetooth or Wireless Lan port).

The instrument includes a laser distance meter 67, compass 68, GPS receiver 69, camera 70, microphone 71 and speaker 72 (not shown in FIG. 7).

The power to each sensor 67-70 (and also to any external sensors, not shown, which might be connected to the external I/O port 56) is controlled asynchronously by software on the central processing platform 60, in conjunction with the power control circuitry 64. This allows the software to switch the various sensors on only when they are required to give data, thus saving power consumption from the internal battery 63.

The power control circuitry 64 may be implemented in a number of different ways, and five examples are shown in FIGS. 9 to 14.

Figure 9:
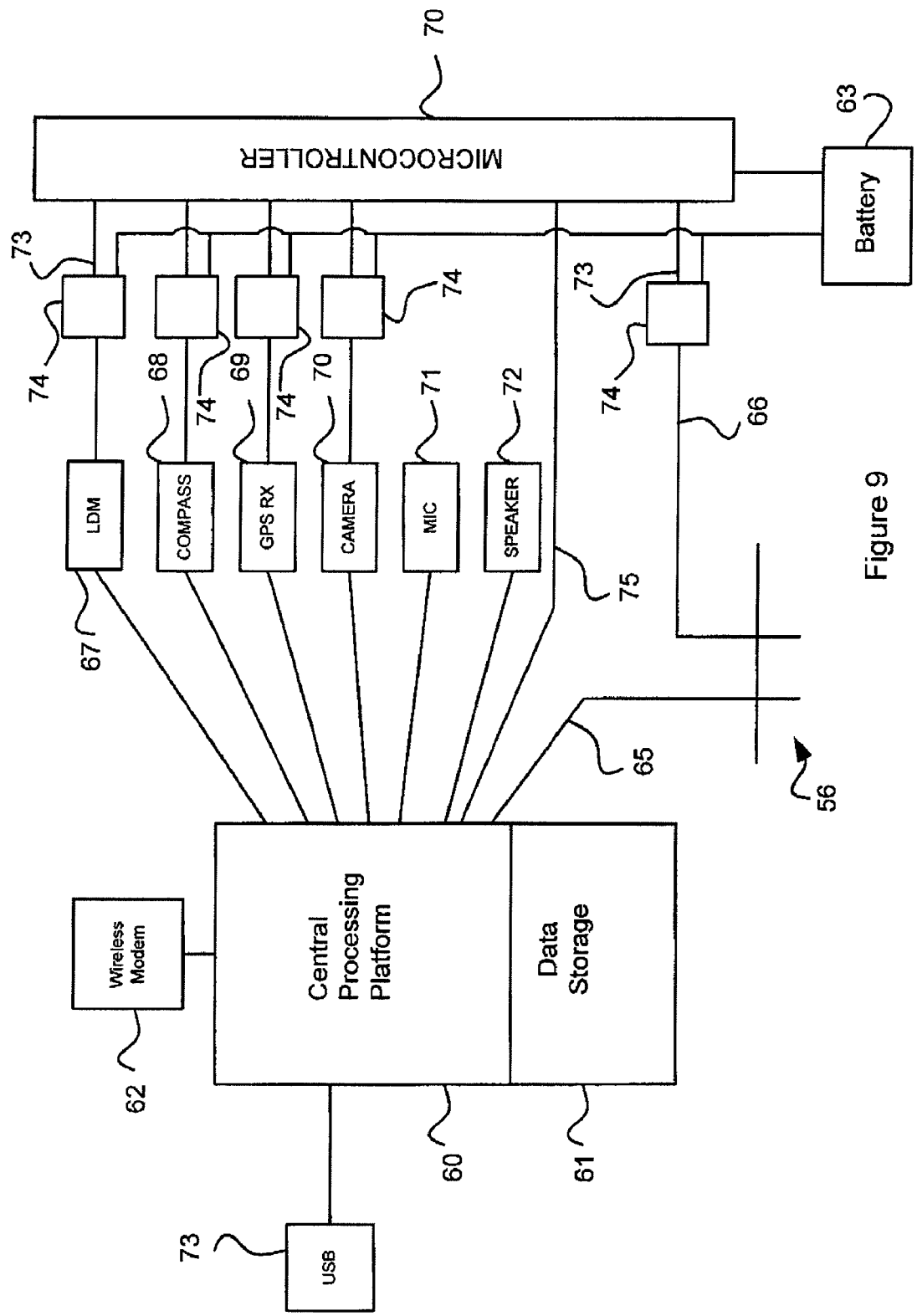
FIG. 9 is a basic block diagram showing a first power control scheme.

In the example of FIG. 9, the power control circuitry 64 comprises a microcontroller 70 and an array of five electronic switches 74. The microcontroller 70 receives a quiescent current (of the order of micro-amps) from battery 63 at all times. The microcontroller 70 is connected to a serial I/O port of the central processing platform 60 via a control line 75, and to each of the switches 74 by a respective digital line 73. The central processing platform 60 issues start and stop commands via the control line 72. Thus for example, if a user operates keypad 53 to request a distance reading to be taken, then the central processing platform 60 issues a "start LDM" command to the microcontroller 70 via the control line 75. The microcontroller 70 then opens switch 74 coupled to the LDM 67, causing the LDM to be connected to the battery 63 and power up. When the LDM 67 has taken a reading, the central processing platform 60 issues a "stop LDM" command and the switch is closed. Similarly, each other sensor 68-70 (and any external sensor which might be connected to the external I/O port 56) can be independently powered on or off in this way.

Figure 10:
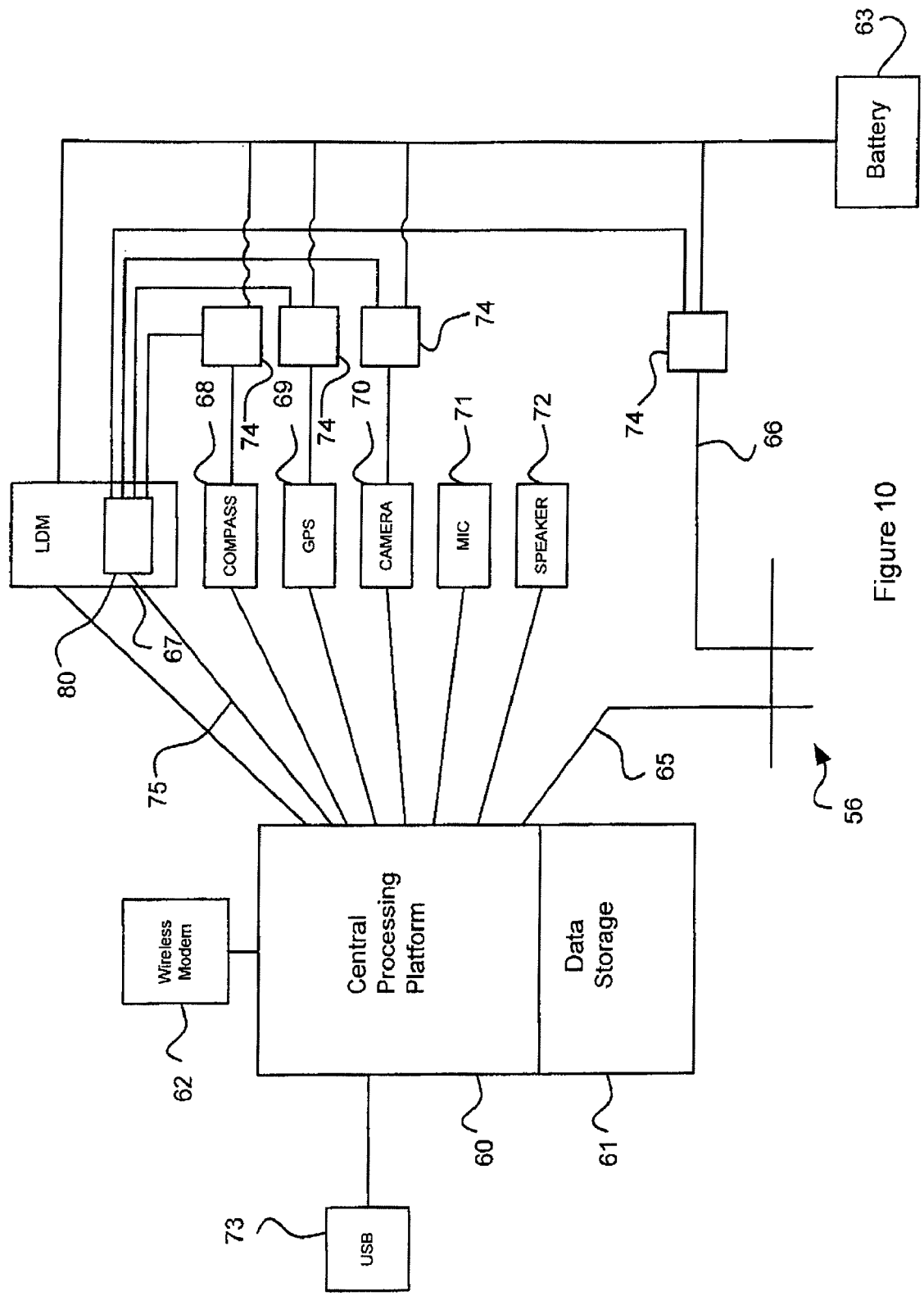
FIG. 10 is a basic block diagram showing a second power control scheme.

In the example of FIG. 10, instead of providing a separate power microcontroller 70, a microprocessor 80 housed in the LDM 67 is utilized to both operate all LDM functions, and also to perform the power control functions performed by the microcontroller 70 in FIG. 9. If necessary, parts of the LDM 67 which are not necessary for power control functions may be turned off when readings are not required from the LDM. Compared with FIG. 9, the system of FIG. 10 required fewer serial ports, and does not require the additional processor 70. Instead of using the LDM 67 as shown in FIG. 10, another sensor (such as the GPS sensor 69) may be used if it has suitable onboard processing.

Figure 11:
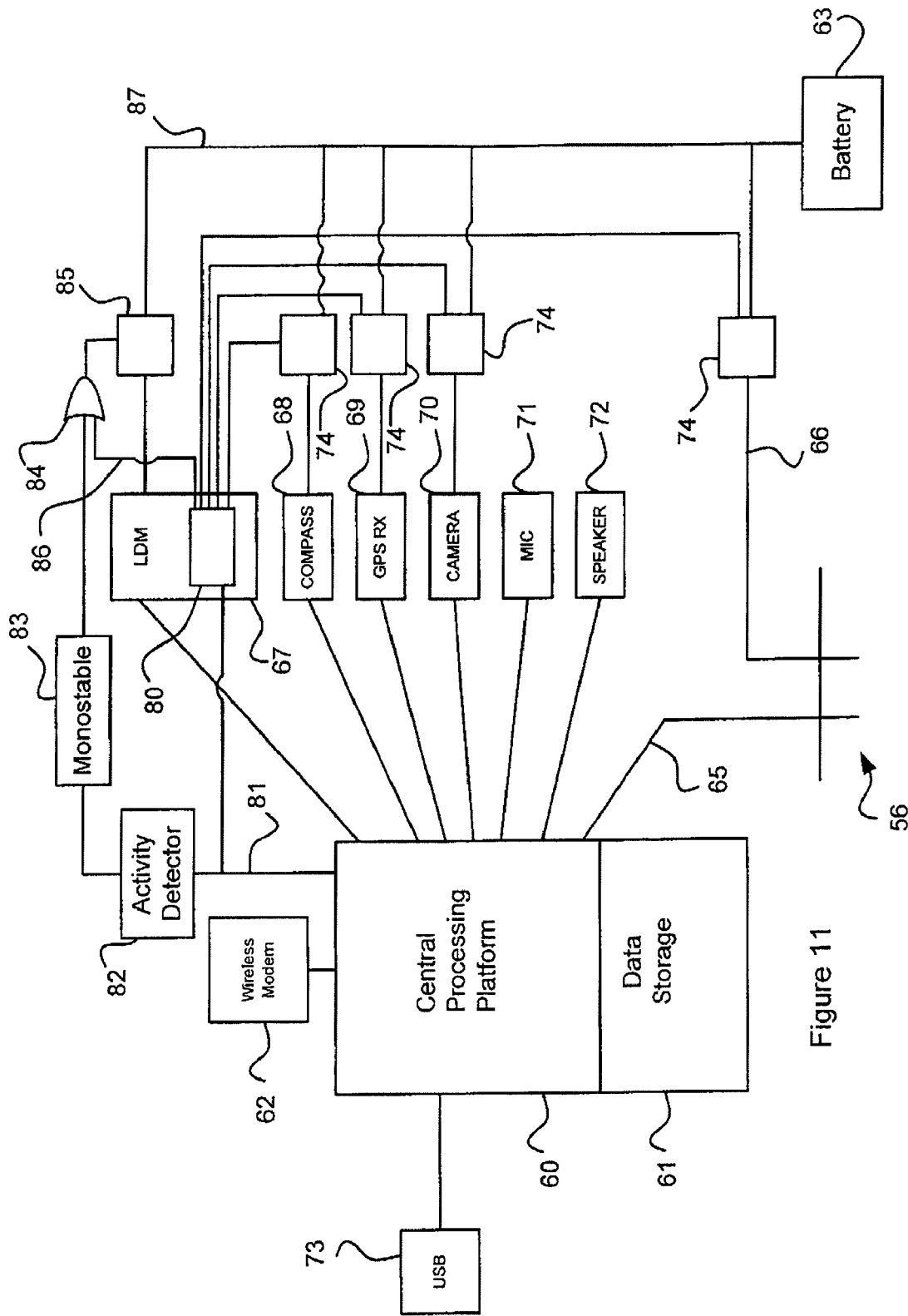
FIG. 11 is a basic block diagram showing a third power control scheme.
Figure 12:
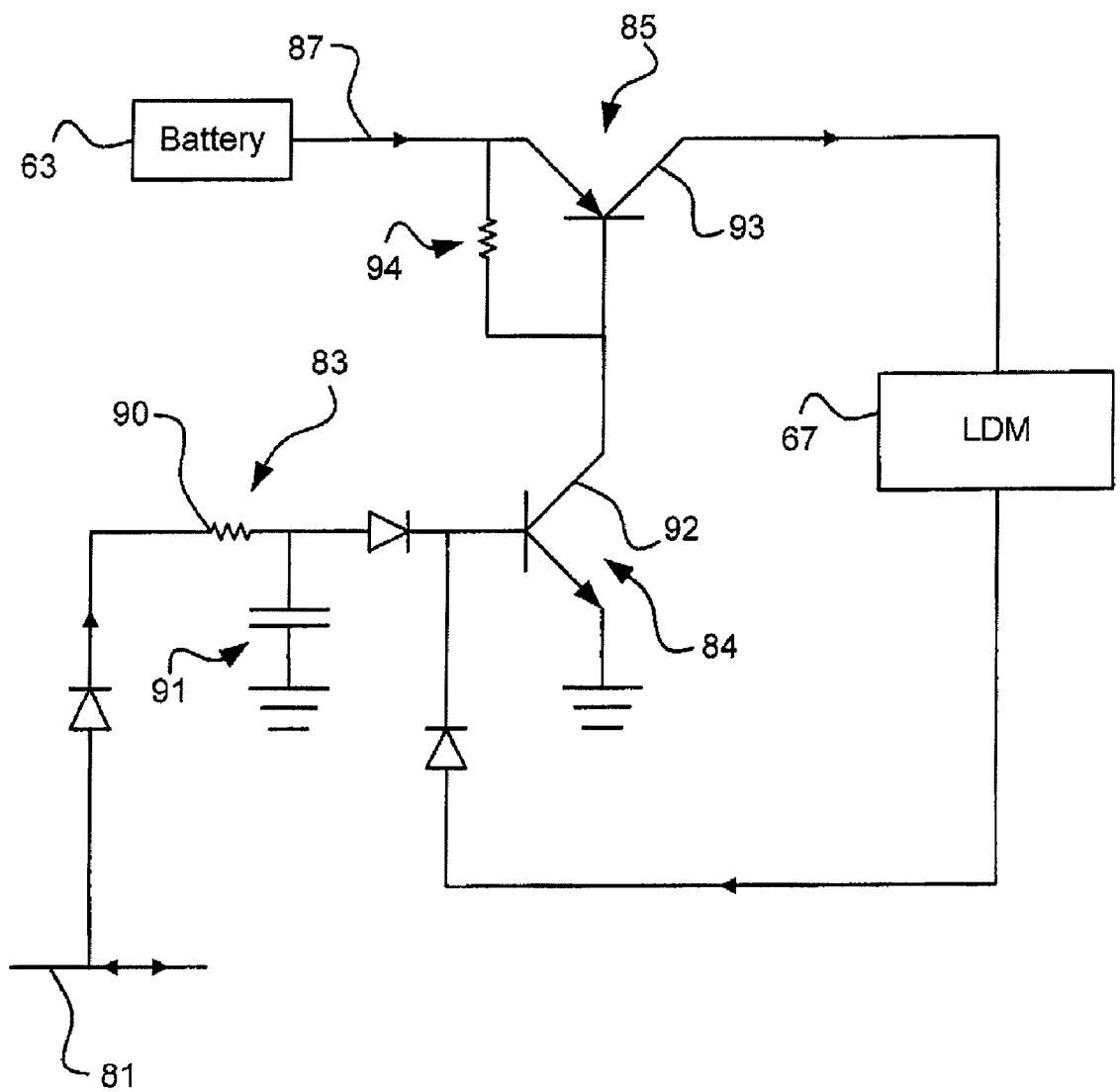
FIG. 12 is a basic block diagram showing a specific implementation of the third power control scheme.

If the quiescent current drawn by the LDM 67 (or other sensor) is too high, then the alternative power control system shown in FIGS. 11 and 12 may be used. In this case, an activity detector 82 is connected to a serial line 81 in parallel with the microprocessor 80. When any activity is sensed on the serial line 81, the activity detector trips a monostable 83. The monostable 83 then activates an OR-gate 84 to turn on an electronic switch 85, which in turn powers up the LDM 67. When the LDM is fully powered up, control line 86 goes high and the LDM remains powered up after the monostable 83 goes low. Thus the time constant of the monostable is set to be sufficiently long to give time for the LDM 67 to power up. After it has performed its required function (that is, after it has taken a reading, or turned on or off one of the other sensors), the LDM 67 can be turned off by issuing a "stop LDM" command on the serial line 81. Thus in the embodiment of FIG. 11, the LDM can be fully turned off, so draws no quiescent current.

The control system of FIG. 11 may be implemented as shown in FIG. 12. Monostable 83 is implemented as an RC-circuit comprising resistor 90 and capacitor 91. OR-gate is implemented by a transistor 92, and switch 85 is implemented by a transistor 93 in parallel with a resistor 94.

Figure 13:
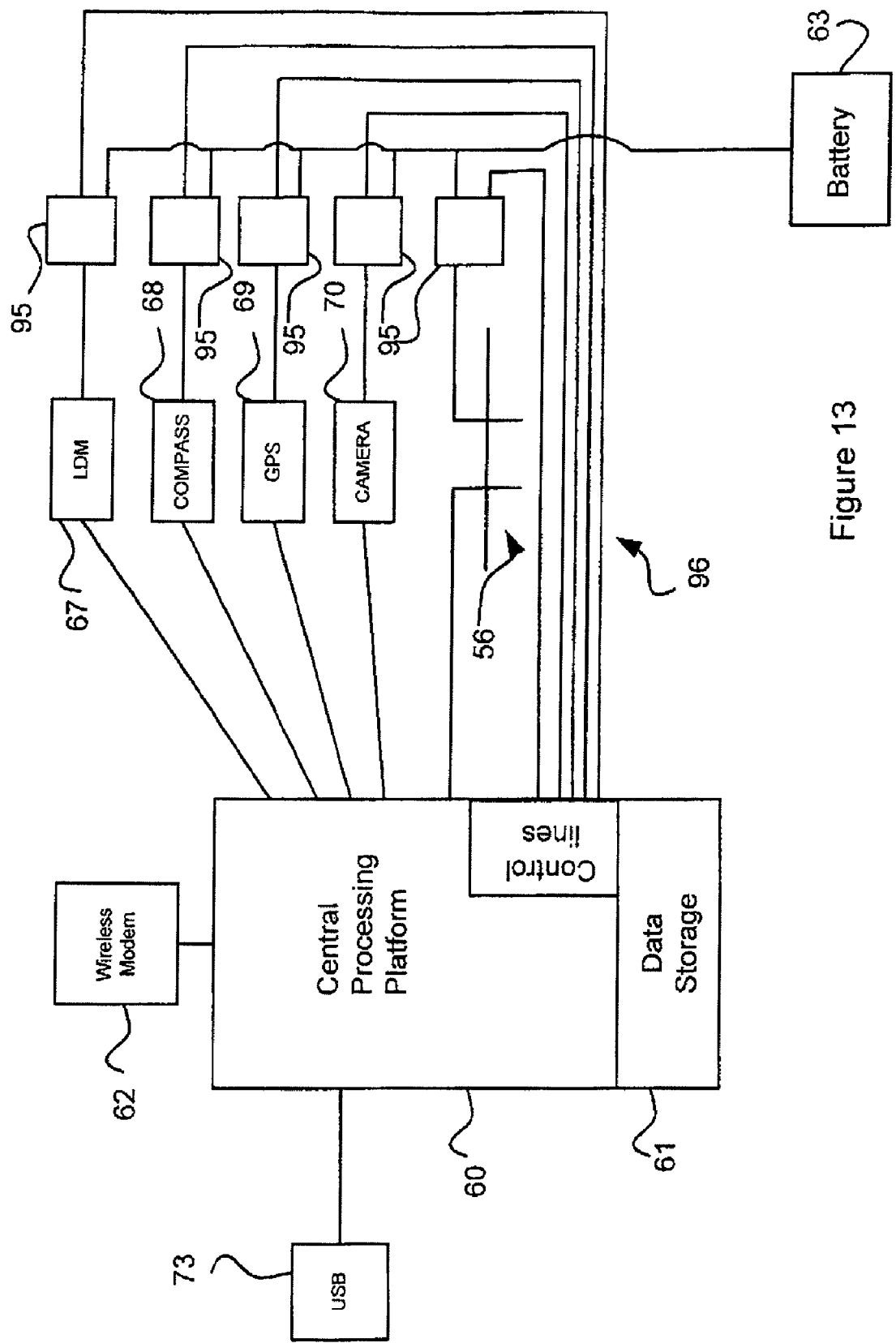
FIG. 13 is a basic block diagram showing a fourth power control scheme.

In the example of FIG. 13, the control system constitutes an array of switches 95 which are each connected directly to the central processing platform 60 (or a system embedded close to it) by a respective control line 96.

Figure 14:
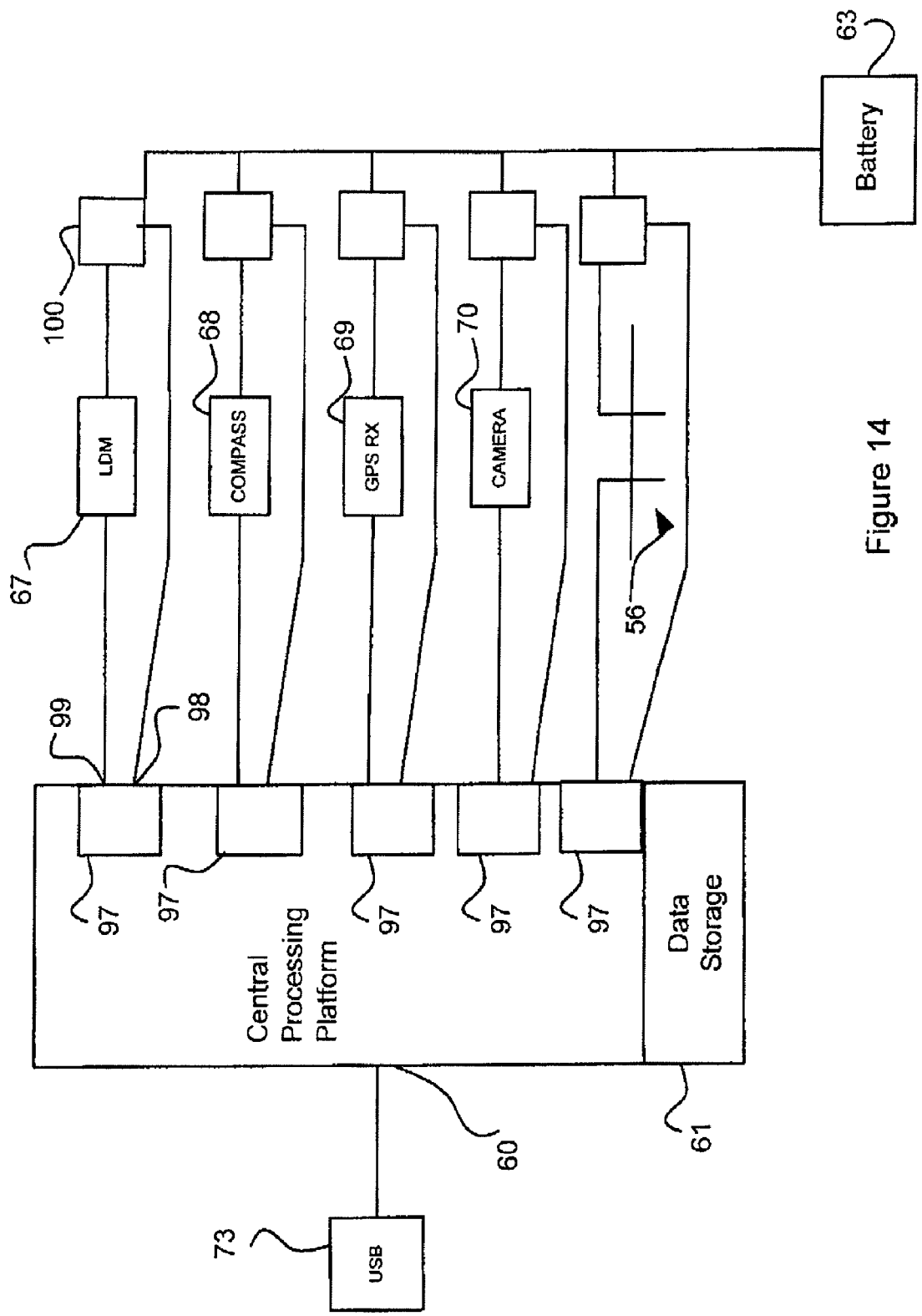
FIG. 14 is a basic block diagram showing a fifth power control scheme.

In the example of FIG. 14, the central processing platform is provided with an array of universal asynchronous receiver-transmitters (UARTs) 97. Each UART 97 has a number of pins including a receive/transmit line 98 and a DTR line 99. The DTR lines 99 are spare handshaking lines which can be digitally controlled by the central processing system 60 via the Microsoft Windows™ Win32 API interface. Each receive/transmit line 98 is coupled to the data port of a respective sensor, and each DTR line is coupled to a respective power switch 100. The method of FIG. 14 is preferred because it is simple, and allows connection to standard serial ports.

When aiming the instrument at a target, the field of view of the camera 70 is displayed on the screen 52. The camera 70 and LDM 67 are aligned to minimise parallax error in the horizontal plane, and parallel in the vertical plane. As a result, the LDM 67 is directed at a fixed datum position in the field of view. In order to indicate the datum position, the central processing platform 60 digitally superimposes a crosshair on the camera's video stream prior to display, centred at the datum position.

A variety of different crosshair patterns are shown in FIGS. 15 to 19. In the example of FIG. 15, four straight black lines 110-113 are arranged in an offset cross configuration. Four straight white lines 114-117 are each arranged adjacent to and parallel with a respective black line. The black lines 110-113 tend to be more visible against light tone subjects, and the white lines 114-117 more visible against dark tone subjects in the background image.

The black and white lines of FIG. 15 may be improved upon by instead providing eight lines 120-127 with alternating black and white portions arranged in a chequerboard fashion as shown in FIG. 16. This method gives a more defined structure to the crosshairs. The thickness of the lines, length of the black and white segments and the black/white alternating ratio depends on the size and resolution of the display screen 52.

The lines in FIGS. 15 and 16 are arranged in an offset cross configuration. This offset can make it difficult for a viewer to precisely discern the datum position at the centre of the cross. Also, the lines at the central region of the cross can block the view of a small target.

These problems can be addressed by the crosshairs of FIGS. 17 and 18, which are identical to FIGS. 15 and 16, except that the central region 128 from which the lines radiate is empty. As a result the background image is visible in the central region.

If the computational resource is available, the visual content (colour and/or brightness) of each line in the crosshair can be changed dynamically to suit the scene to be photographed. However, preferably the colour and/or brightness is fixed.

Instead of providing a regular alternating pattern as shown in FIGS. 16-18, each line can alternate randomly between the black and white portions.

In a fifth example shown in FIG. 19, a white cross 130 is surrounded by a black border 131. The inverse of FIG. 19 could also be used.

The instrument can record many types of data: including text input from keypad 53, input from touch-sensitive screen 42, images from camera 70 (for instance in .jpg or .bmp format), sounds from microphone 71 (for instance in .wav format), GPS position data from GPS receiver 69, and bearing and inclination data from compass 68.

A typical data reading is taken as follows:
1. User points instrument at desired target
2. User presses key on keypad 52 to take reading
3. Instrument acquires image and (optionally) sound data
4. Instrument acquires spatial metadata associated with the image, including
   a. Position of the Unit (GPS)
   b. Distance (Laser Distance Meter)
   c. Azimuth bearing (Electronic tilt compensated compass)
   d. Platform tilt from plumb (Tilt sensors on compass)
5. Instrument acquires time/date of measurement associated with the image
6. Instrument acquires human user input metadata associated with the image. This is acquired by asking a sequence of questions which are answered by the human user via keypad 52 or touch-sensitive screen 53. The questions might be for example:
   a. What is the name of the article for this reading? The user is presented with a menu of items to select from, such as:
      i. power-pole
      ii. transformer
      iii. road
   b. The user is then presented with a series of further questions, depending on the answer given in a. For example if the user answers 'i. power pole', then they may be asked:
      i. How many cross bars does the power pole have?
      ii. How many insulators does the power pole have?
      iii. What is the physical condition of the insulators (on a scale of 1-10)?

The sequence of questions in item 6 above are answered when the user is at the scene. Leaving interpretation of the gathered information to a later date is not preferable as the user may have forgotten the exact details. This is especially a problem when many similar objects are measured, for instance power poles. The answers to subjective questions (for instance question 6.b.iii.) can also be verified later with reference to the recorded image.

Figure 20:
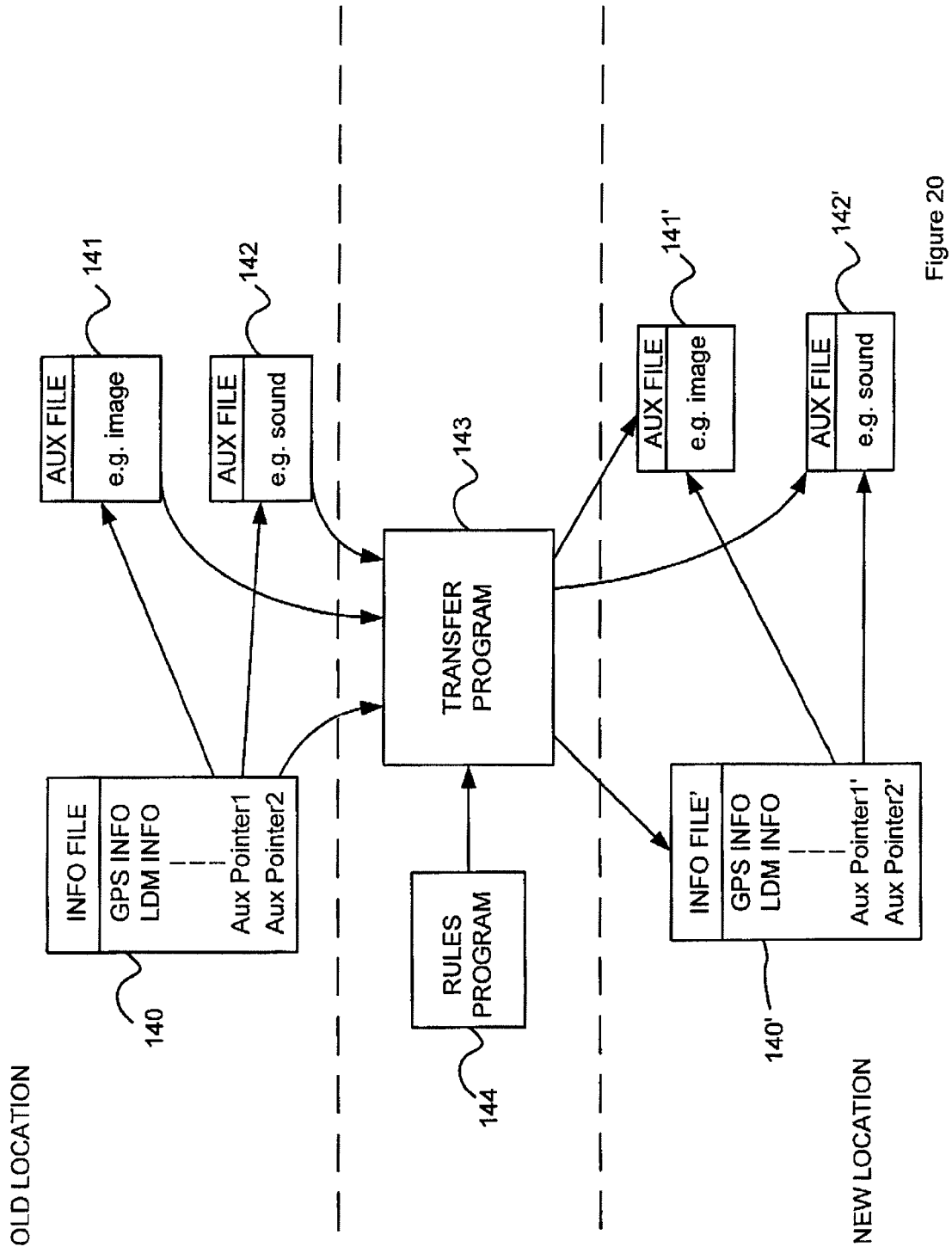
FIG. 20 is a process diagram showing the file transfer process.

The metadata recorded in steps 4, 5 and 6 above is stored in an information file 140 shown in FIG. 20. The information file may for instance be a text file or a spreadsheet file. The sound and image data is typically in a different format and is not practical to include in the information file. For example the image file may be in a standard format such as .jpg or .bmp, so it may be more useful to store the image as a separate file. Therefore the image data associated with the information file 140 is saved in a first auxiliary file 141 and the sound data associated with the information file 140 is saved in a second auxiliary file 142. If desired, further images may be acquired of the same target (for instance, views from different angles), and stored in third, fourth etc auxiliary files. The information file 140 contains a pointer to each associated auxiliary file 141,142 etc. For instance the pointer to first auxiliary file 141 might be xyz/1.jpg and the pointer to the second auxiliary file 141 might be xyz/1.wav.

After the user has acquired a series of information files and associated auxiliary files, the user may wish to upload the data to a new location. This is done by a transfer program 143, typically running on an external device (such as a personal computer).

Before executing a transfer, the transfer program 143 receives a set of rules from a rules program 144. For instance the rules program 144 may specify a set of rules related to a database structure, which determine how the information files and auxiliary files are sorted based on type, size, name, or date.

The process flow of the transfer program is as follows:
1. Receive user input which points the transfer program to an existing information file
2. Determine a new location for the information file based on the rules from the rules program
3. Read information file via USB port 73 or wireless modem 62, looking for pointers to auxiliary files
4. Determine a new location for all of the auxiliary files pointed to by the information file, based on the rules from the rules program
5. Find auxiliary files and copy or move the auxiliary files to the new locations determined in steps 2 and 4
6. Update the information file with the new locations of the auxiliary files. For instance, the file paths given above may be updated to abc/1.jpg and def/1.wav.
7. Save the information file to the new location (see item 140' in FIG. 20)
8. Save the auxiliary files to their new locations (see items 141' and 142' in FIG. 20)
9. Verify the new files 140'-142' and erase the old files 140-142 if required The transfer program ensures that the pointers in the new information file 140' are valid, and enables the rules program to re-order the auxiliary files 141', 142' if required.

Data in the information files 140 or 140' (such as the time/date data, or the human user input metadata) can be used for subsequent searching. For instance a search engine might seek all information files (and associated auxiliary files) relating to power poles, or relating to power poles having insulators having a condition rated below 5 on a scale of 1 to 10.

Figure 21A:
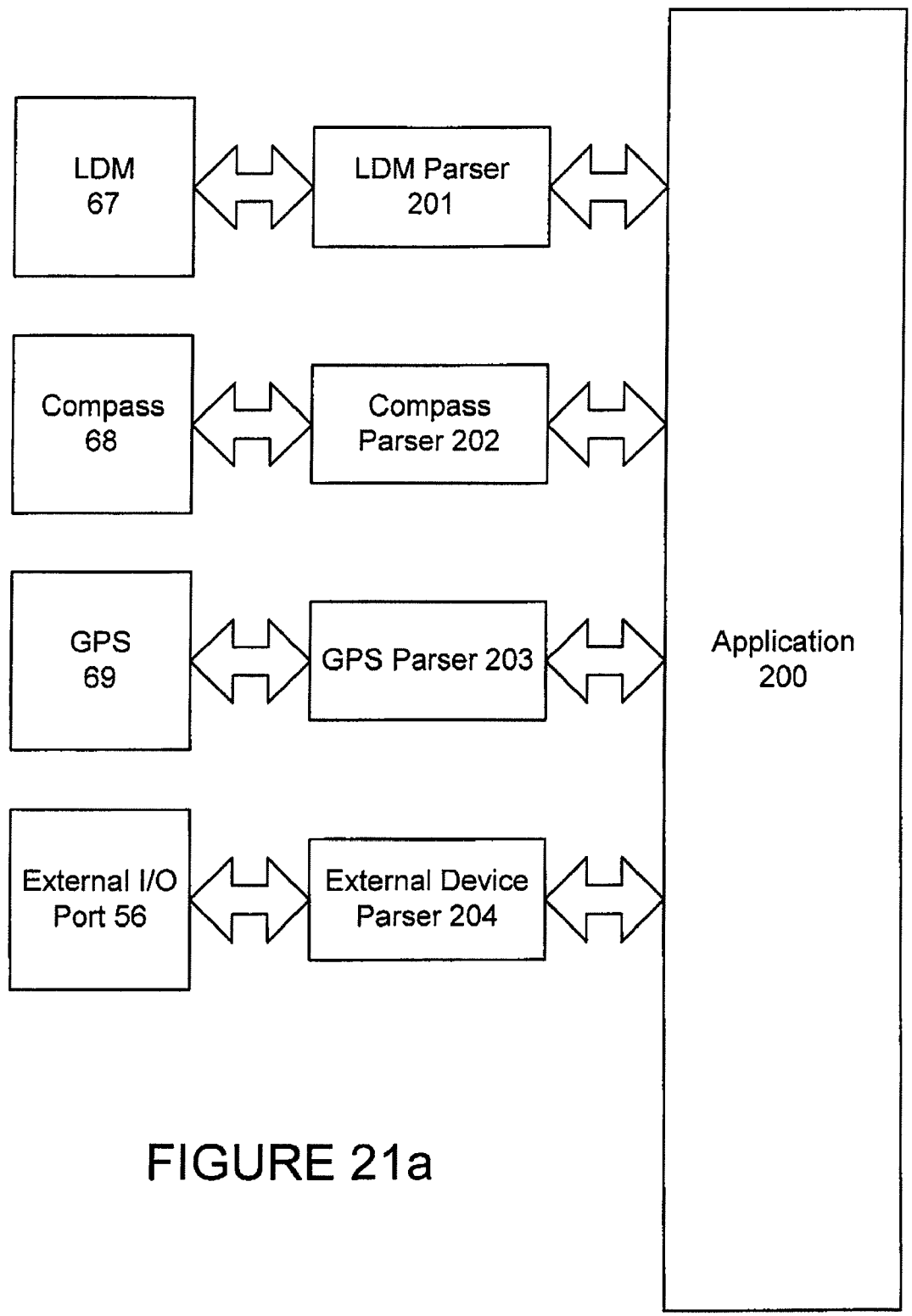
FIG. 21a is a block diagram showing a first parsing system.

FIG. 21a is a schematic overview of a first parser system. An application 200 and an array of four dedicate parsers 201-204 are run on the central processing platform 60. The description of FIG. 21a contains certain terms which are defined below.

A specialised ASCII notation is used. It arises because there are 256 distinct characters that can be sent to/from a device. Many of these characters are easily recognised and human recognisable, such as the lower case letters a-z, the upper case letters A-Z and numbers 0-9. However, there are a number of other characters which are not so easily displayed. These include the common 'carriage return' and 'line feed' duo.

In the specialised ASCII notation, all characters that are easily recognised are shown as their character, so an 'A' is still an 'A' and a '1' is still a '1'. But all other characters are denoted by their character value (0 to 255) in square brackets; so [13] is a 'carriage return' and 'line feed' is [10].

Hence the string: "PON[13]", which turns the power mode of the Laser from stand-by to full power, consists of the characters 'P', 'O', 'N' and a 'carriage return'.

A 'Regular Expression' is something that allows pattern matching. For example, if you knew a device reading ended with decimal point followed by two numbers. You could use regular expressions to say you were looking for the following footer:

.\d\d where "\d" stands for any digit. This would match "0.98" but not "0.9a" or " . . . ".

Examples of the regular expressions are as follows:
\[xyz] A character set. Matches any one of the enclosed characters. For example, "[abc]" matches the "a" in "plain".
\[a-z] A range of characters. Matches any character in the specified range. For example, "[a-z]" matches any lowercase alphabetic character in the range "a" through "z".
\ Marks the next character as either a special character or a literal. For example, "n" matches the character "n". "\n" matches a newline character. The sequence "\\" matches "\" and "\(" matches "(".
\d Matches a digit character. Equivalent to [0-9].
\D Matches a non-digit character. Equivalent to [^0-9].
\n Matches a newline character.
\r Matches a carriage return character.
\xmn Matches mn, where mn is a hexadecimal escape value. Hexadecimal escape values must be exactly two digits long. For example, "\x41" matches "A". "\x041" is equivalent to "\x04" & "1". Allows ASCII codes to be used in regular expressions.
\x[010506] Allows a set of ASCII values
\x[01-06] Allows a range of ASCII characters
\. Matches any single character An "ATL COM DLL", is an 'Active Template Library' 'Component Object Model' 'Dynamic Linked Library'. This is a component that provides an application writer with a set of libraries they can use from within their own application, simplifying their job.

Returning now to a description of FIG. 21a, the LDM 67, compass 68 and GPS 69 are typically "of-the-shelf" devices which are intended by their manufacturers for stand alone use. For example, when hooked up to a desktop or laptop computer, it is a simple job for a user using a terminal emulation programme to use the LDM to calculate distances. This task need not be automated. In other words, a user can just set the LDM up, request a one-shot measurement and write down the measurement for use at a later date. The instruction manual for the LDM, as is typical for this kind of device, has explicit instructions for this type of use and the data sent and retrieved is explicitly made human readable.

However, the instrument of FIG. 7 requires that this 'data collection' be automated, and that the instrument can collate the simultaneous data from the GPS, Laser, and Compass, and use this data to work out the position of a target. As a result, each device is provided with a dedicated parser. For instance the LDM has a dedicated LDM parser 201 which sends instructions to the LDM and retrieves and record the data from the responses.

The LDM parser 201 performs the following functions:
1. Create connection to the LDM
2. Send request for a measurement
3. Identify when a complete message has arrived
4. Get the distance measurement out of the message
5. Repeat steps 2 through 4 as required
6. Sever the connection For the LDM, this requires:
1. Opening the appropriate RS-232 COM Port with the appropriate connection parameters
2. Sending the string "D[13]" to request the measurement
3. Assembling the string, the reply being of the format "DIST:XXX.XU[13][10]", where XXX.X is the numerical distance measurement to 1 decimal place, U is either 'm', 'y' or 'f', depending on the units being used, and [13][10] is a 'carriage return' followed by a 'line feed'.
4. 'Deciphering' the message, to get the "XXX.X" bit out and converting this to a number.
5. Closing the appropriate RS-232 COM Port.

The LDM parser 201 runs on a Pocket PC 2002 device such as a Compaq iPAQ. The two main development environments for this device are as follows:
1. Microsoft Embedded Visual Basic v3.0 (eVB)
2. Microsoft Embedded Visual C++v3.0 (eVC)

The eVB environment is familiar to programmers who use Microsoft Visual Basic 6.0 on the desktop computer. It requires only a low level of programming ability and is an easy language to produce 'proof of concept' type work, but is characterised by very poor performance in terms of:

High memory usage
Slow execution times

This is particularly significant on Pocket PC devices which do not have the processing power or vast memories of their modern desktop computer counterparts.

By contrast eVC requires a far higher level of programming ability but uses far less memory and runs much faster.

It is also possible to write an application in eVB that uses eVC components to do 'the donkey work'; the things that require minimal quantities of memory and or fast execution times.

The LDM parser 201 may be written in eVB. However, if the LDM is not in one-shot mode but in 'streaming' mode (where it takes a reading 20 times per second (20 Hz) and sends the result to the 'host', in this case the Pocket PC device), the LDM parser 201 may not be able to keep up with the work it is required to do.

This result is particularly important given that the overall goal is to produce a program that integrates not just the LDM but other RS-232 devices also. If an eVB programme cannot manage one device, there would be no way that it would be capable of managing three simultaneously.

Therefore, the LDM parser 201 incorporates an 'ATL COM DLL' written in eVC that does part of the job. This requires an interface between the eVB application and the eVC component.

The eVC component manages the creating and severing of the connection to the LDM on instruction form the eVB application. The eVB application still manages the 'deciphering' of the message, the main difference with the "solely eVB" method being that the eVB application receives 'chunks' of data—maybe several characters or a whole message at once, rather than one character at a time.

The compass parser 202 incorporates a further 'ATL COM DLL' which is written to provide an interface to a compass. This is a slightly different case as instead of receiving one piece of data per message, as is the case with the LDM, the Compass 68 provides three pieces of data, Bearing, Pitch and Roll, with every reply.

The following is an example compass string:
$R-2.61P1.08T21.5C43.9

In this example, the Roll=−2.61, Pitch=1.08 and the Bearing=43.9. The third parameter is not useful to the device.

The parser in the eVB application for the compass first has to find the beginning of the string, which it does by looking for the "$R" combination. The Roll is detected by finding the "P" in the string and converting what is between the "R" and "P" into a number, which may be positive or negative. Similarly, the Pitch is given by the string between the "P" and the "T".

To reliably get the Bearing, it has to be known that this is always measured to 1 decimal place, which means that the decimal point could be the character looked for after the "C", and that the Bearing is the conversion of the data between the "C" and the character one after the decimal place.

The next device to be dealt with in this way is the GPS. The GPS could use one of two standard type data 'protocols'. These are known as:

NMEA (National Marine Engineering Association)
CMC (Canadian Marconi Company) Binary The following string is an example of the 'NMEA' protocol string that may be received from the GPS.

$GPGGA,234016.01,4115.22415,S,17445.34868,E,1,06, 1.3,176.2,M,19.0,M,*7F

The string starts off with the "$GP" header, which indicates the type of GPS this data is from. The "GGA" following this indicates that this message is a one-shot GPS position information string. After this all the parameters associated with this message type follow, delimited by commas. The ones of particular interest to the device are the Latitude, which is 41° 15.22415" (S)outh, and Longitude which is 174° 45.34868" (E)ast. The string ends with a "*" followed by a checksum, which in this case is "7F".

Detecting the string 'header' is a matter of looking for the combination "$GPGGA". The end of the string is acquired by the appearance of 14 subsequent commas (not necessarily consecutive) followed by a "*", the end of the string being exactly two characters later.

This presents the new challenge of having parameters that are no longer just numbers, the "S" and "E" standing for "South" and "East" respectively.

The equivalent string in CMC binary protocol looks like this:

[1][21][234][79][32][47][0][0][0][129][204][64][186][4]
[226][240][242][154][181][58][82][193][182][203][42]
[125][176][167][26][65][52][102][196][137][236][242]
[79][193][216][193][127][189][110][203][143][60][23]
[10][250][187][41][142][62][137][9][145]

| Bytes | Description | Unit | Type |
|---|---|---|---|
| 5 ... 12 | GPS Time range: 0.0 ... 604800.0 | Seconds | long float |
| 13 ... 14 | Week | Weeks | word |
| 15 ... 22 | X Position in GPS units | Meters | long float |
| 23 ... 30 | Y Position in GPS units | meters | long float |
| 31 ... 38 | Z Position in GPS units | meters | long float |

| Bytes | Description | Unit | Type |
|---|---|---|---|
| 39...42 | X Velocity in GPS units | meters per second | short float |
| 43...46 | Y Velocity in GPS units | meters per second | short float |
| 47...50 | Z Velocity in GPS units | meters per second | short float |
| 51...58 | Z Velocity in GPS units | meters per second | short float |
| 59...66 | Clock Drift | seconds/ second | long float |
| 67...70 | HFOM | meters | short float |
| 71...74 | VFOM | meters | short float |
| 75...76 | HDOP | resolution: 0.1 units | N/A word |
| 77...78 | VDOP | resolution: 0.1 units | N/A word |
| 79 | NAV Mode (see message #20, byte 71 for the description) | N/A | N/A |
| 80 | bits 0...3: Nb of SV used to compute this solution bits 4...7 Reserved | N/A | N/A |
| 81...83 | Reserved | N/A | N/A |

An alternative approach uses the CMC binary protocol. In this case the GPS parser 203 needs to:
1. Receive constantly streaming GPS position data, so at any given moment it is known if a GPS fix was available
2. Receive constantly streaming GPS Satellite data, so that at any given moment it is possible to view the GPS Satellite constellation, and hence have a good idea:
   a. How long it will be until a better GPS fix can be acquired
   b. What can be done (in terms of moving the instrument) to increase the likelihood of getting a GPS fix This means two things: firstly, the parser would have to be moved into the eVC component; and secondly, the eVB application is far too slow to perform the required 'deciphering' at the rate the GPS streams data.

Figure 21B:
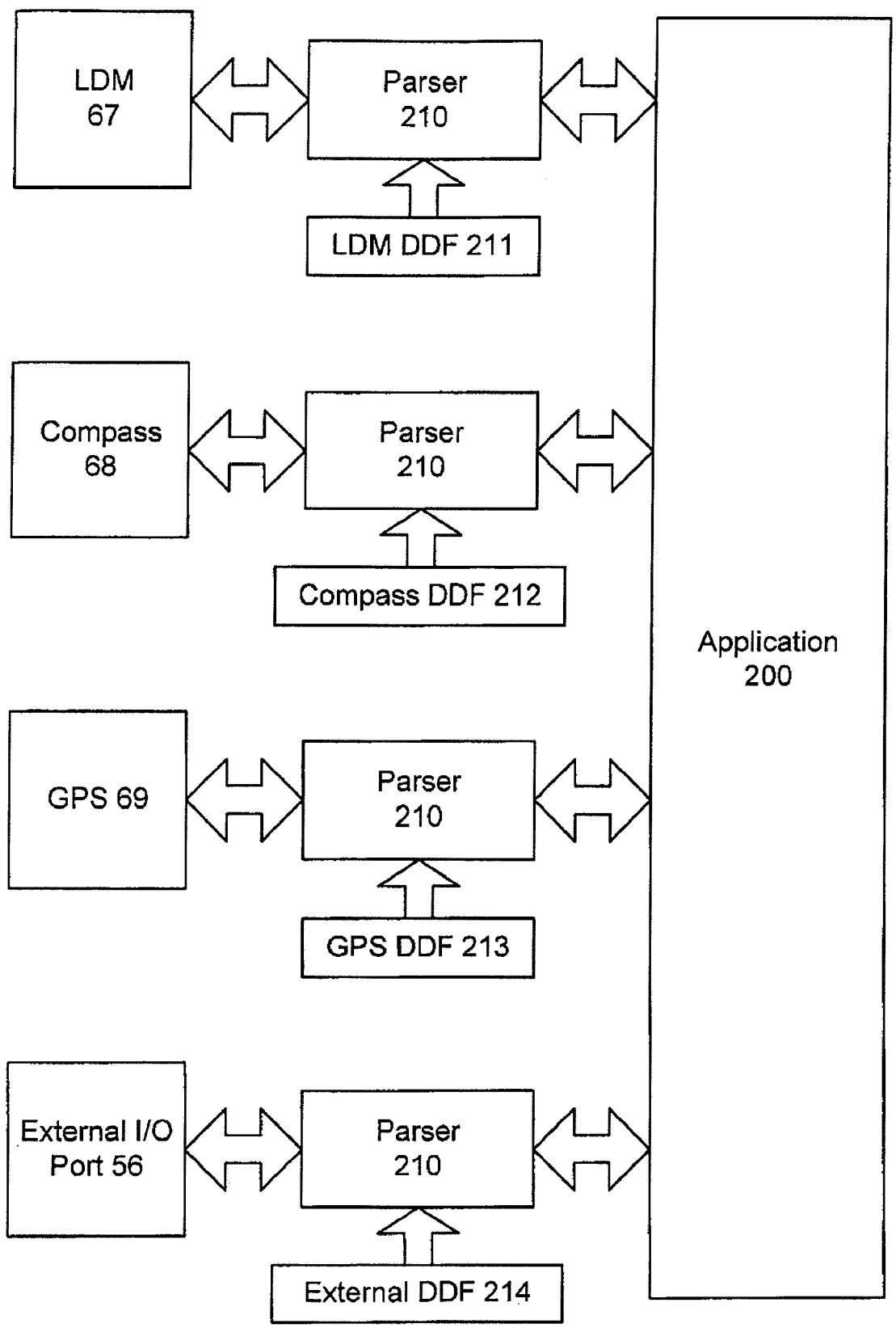
FIG. 21b is a block diagram showing a second parsing system.

An alternative parsing system is shown in FIG. 21b. The purpose of the system is to allow a user to quickly and simply be able to communicate with their device, whatever connection their device happens to use and whatever way their device happens to work.

The dedicated parsers 201-204 are replaced by a parser 210 and a respective device description file 211-214. Each parser 210 is identical. By way of example, the LDM system is shown in FIG. 21c.

Figure 21C:
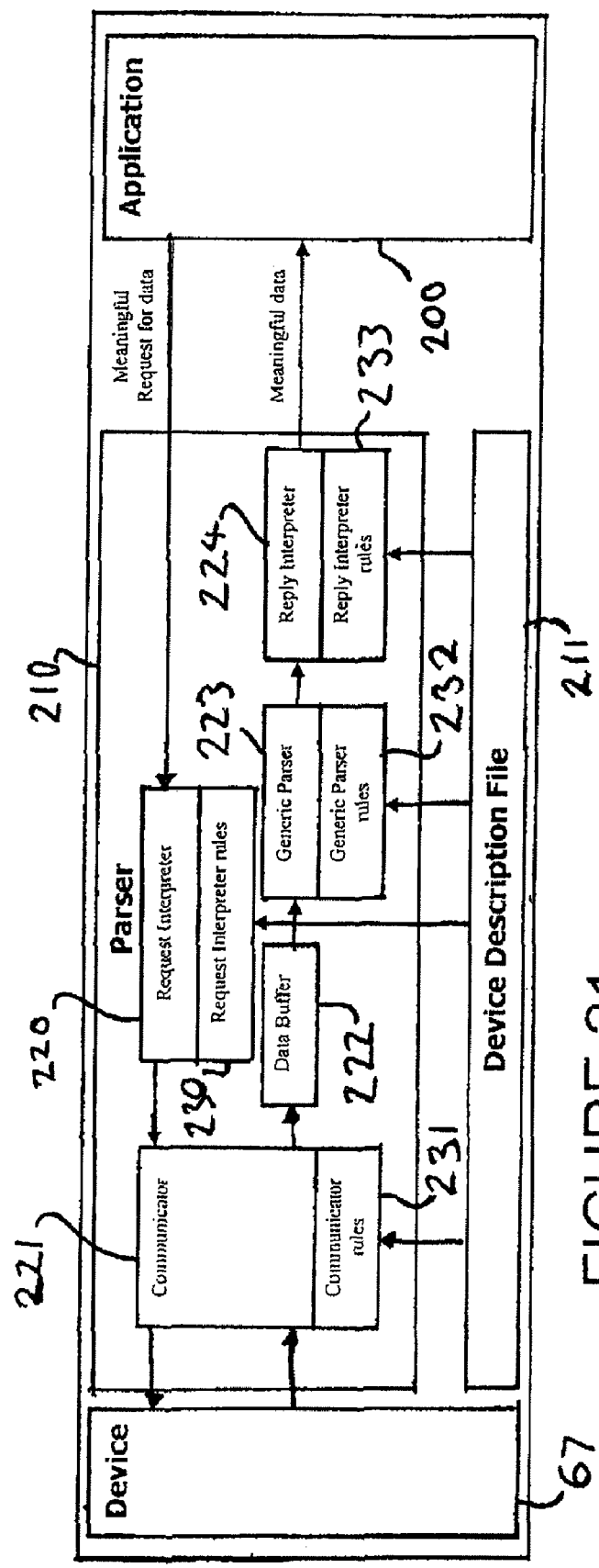
FIG. 21c shows in detail the LDM parser.

FIG. 21c includes the following components
1. The Application 200. This application can instruct the Parser 210 to send requests for information to the LDM 67. The Parser 210 in return raises events in the application when this request is met, and tells the application where to find this data.
2. The LDM 67.
3. The Device Description File (DDF) 211 that describes the LDM 67

The DDF contains the rules for using the device, including:
Connection type (e.g. IEEE 802.11b) and associated parameters
Messages that can be sent to the device
How to identify messages that can be received from the device
Parameters within those messages
4. The Parser 210.

The parser 210 deals with all information that flows between the application and the Device via data gathered from the Device Description File.

The parser 210 consists of five components. These are:
1. A Request Interpreter 220 which interprets requests for data made by the application 200
2. A Communicator 221, which controls communicates with the device 67
3. A Data Buffer 222, which is the repository for data that is received from the device
4. A Generic Parser 223 which identifies individual messages within the Data Buffer 222
5. A Reply Interpreter 224, which interprets these identified messages, and passes the results to the Application 200.

The Request Interpreter 220 takes a request for a message to be sent to the device, determines what data has to be sent and passes this data to the communicator for sending.

Figure 22:
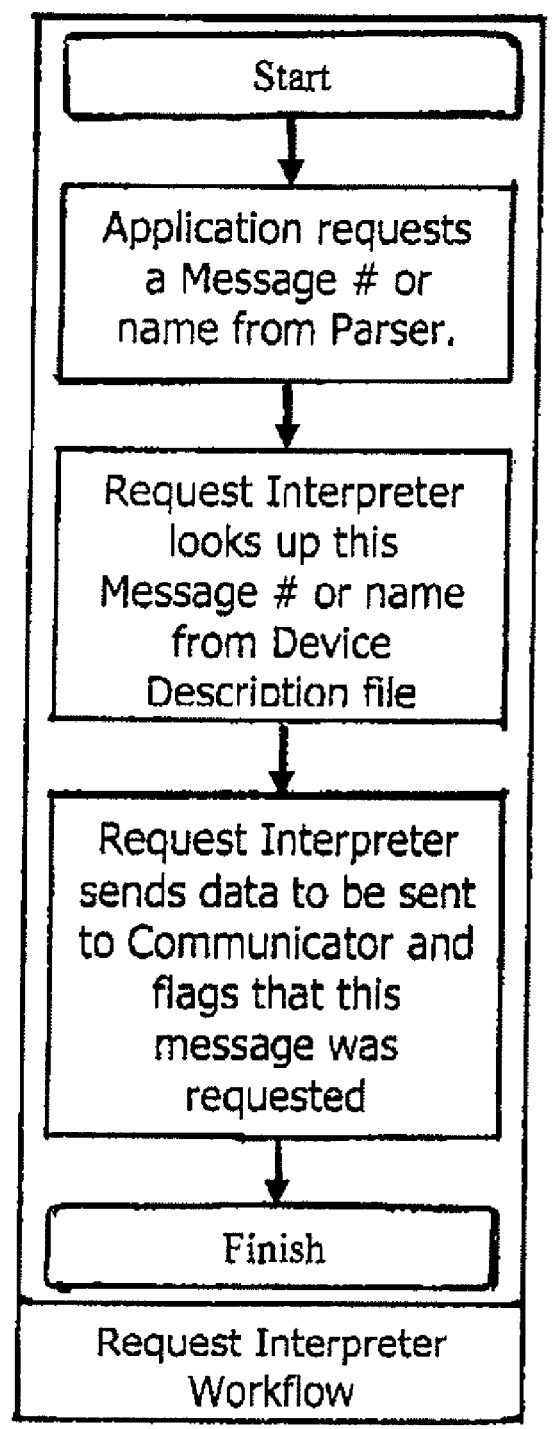
FIG. 22 shows the Request Interpreter workflow.

FIG. 22 shows the basic workflow involving the Request Interpreter, assuming no errors.

The Request Interpreter follows a set of Request Interpreter rules. The Device Description File 211 includes a numbered list of each of the 'requests' or 'commands' that can be sent to the device. The application makes a request for data by referring the request/command by number or name. For example, a Laser has the following command set in a Device Description File:

| Message # | Message Name | Message Effect | Data Sent |
|---|---|---|---|
| 1 | Reading | Take a one-shot reading | D[13] |
| 2 | Status | Get Laser Status | X[13] |
| 3 | Counts On | Turn Counts mode on | CON[13] |
| 4 | Counts Off | Turn Counts mode off | COFF[13] |
| 5 | Tracking Off | Turn Tracking Mode on | TON[13] |
| 6 | Tracking On | Turn Tracking Mode off | TOFF[13] |
| 7 | Fast On | Turn Fast Mode on | FON[13] |
| 8 | Fast Off | Turn Fast Mode off | FOFF[13] |
| 9 | Control 1 On | Turn on control line 1 | 1ON[13] |
| 10 | Control 1 Off | Turn off control line 1 | 1OFF[13] |
| 11 | Control 2 On | Turn on control line 2 | 2ON[13] |
| 12 | Control 2 Off | Turn off control line 2 | 2OFF[13] |
| 13 | Control 3 On | Turn on control line 3 | 3ON[13] |
| 14 | Control 3 Off | Turn off control line 3 | 3OFF[13] |
| 15 | Units Meters | Change measure mode to "Meters" | UM[13] |
| 16 | Units Feet | Change measure mode to "Feet" | UF[13] |
| 17 | Units Yards | Change measure mode to "Yards" | UY[13] |
| 18 | Full Power | Switch to Full Power Mode | PON[13] |
| 19 | Stand by | Switch to Stand by Mode | POFF[13] |

[13] stands for a 'Carriage Return', or ASCII 13.

An application using this device wanting a 'one-shot reading' would send a request to the Parser 210 for message #1 or 'Reading'. The Request Interpreter 220 would look up message #1 or 'Reading' and find "D[13]" as the data to be sent, and send this to the Communicator 221. The Request Interpreter 220 would also flag to the interpreter that a reply from this message was expected.

Figure 23:
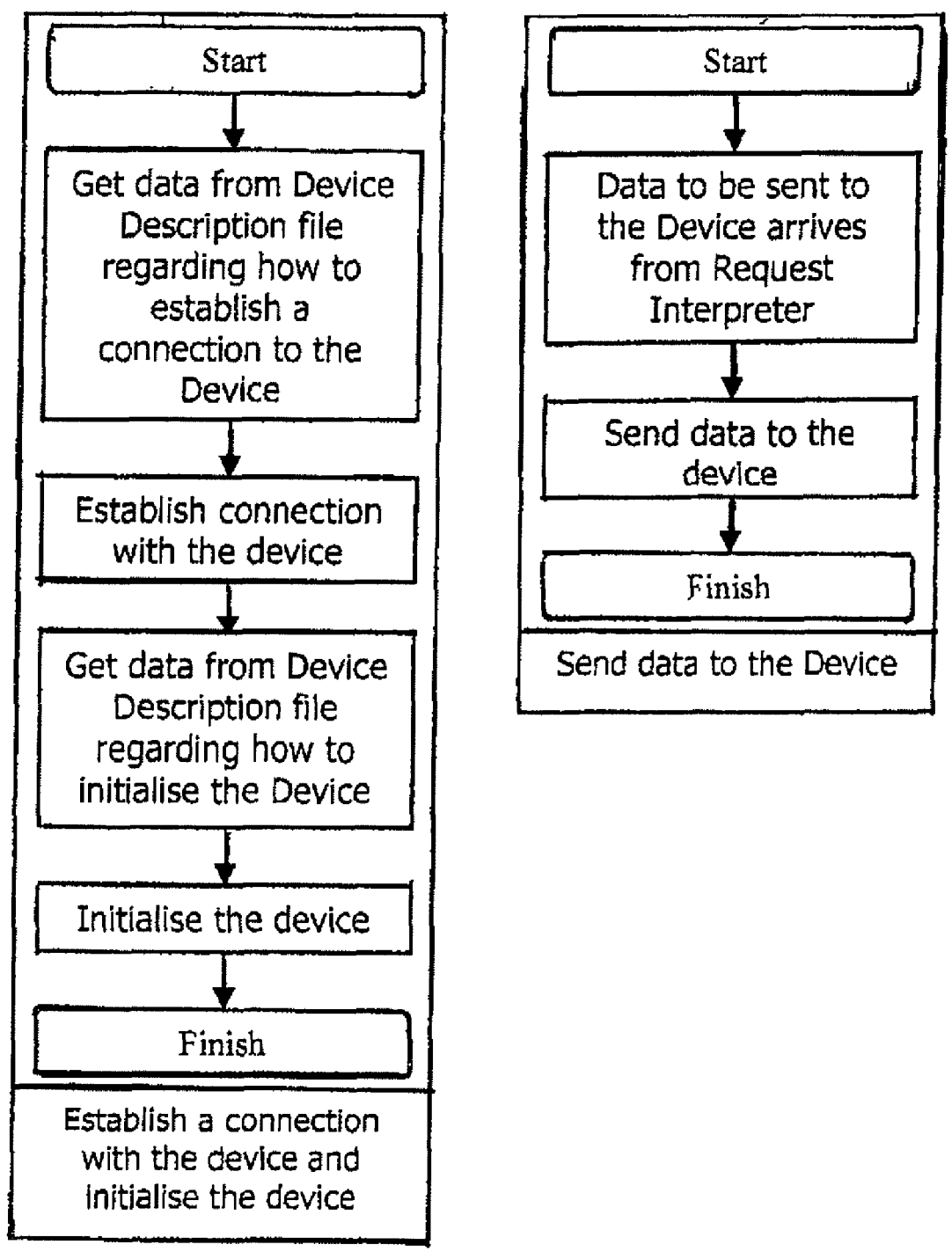
FIGS. 23 and 24 show four Communicator workflows.
Figure 24:
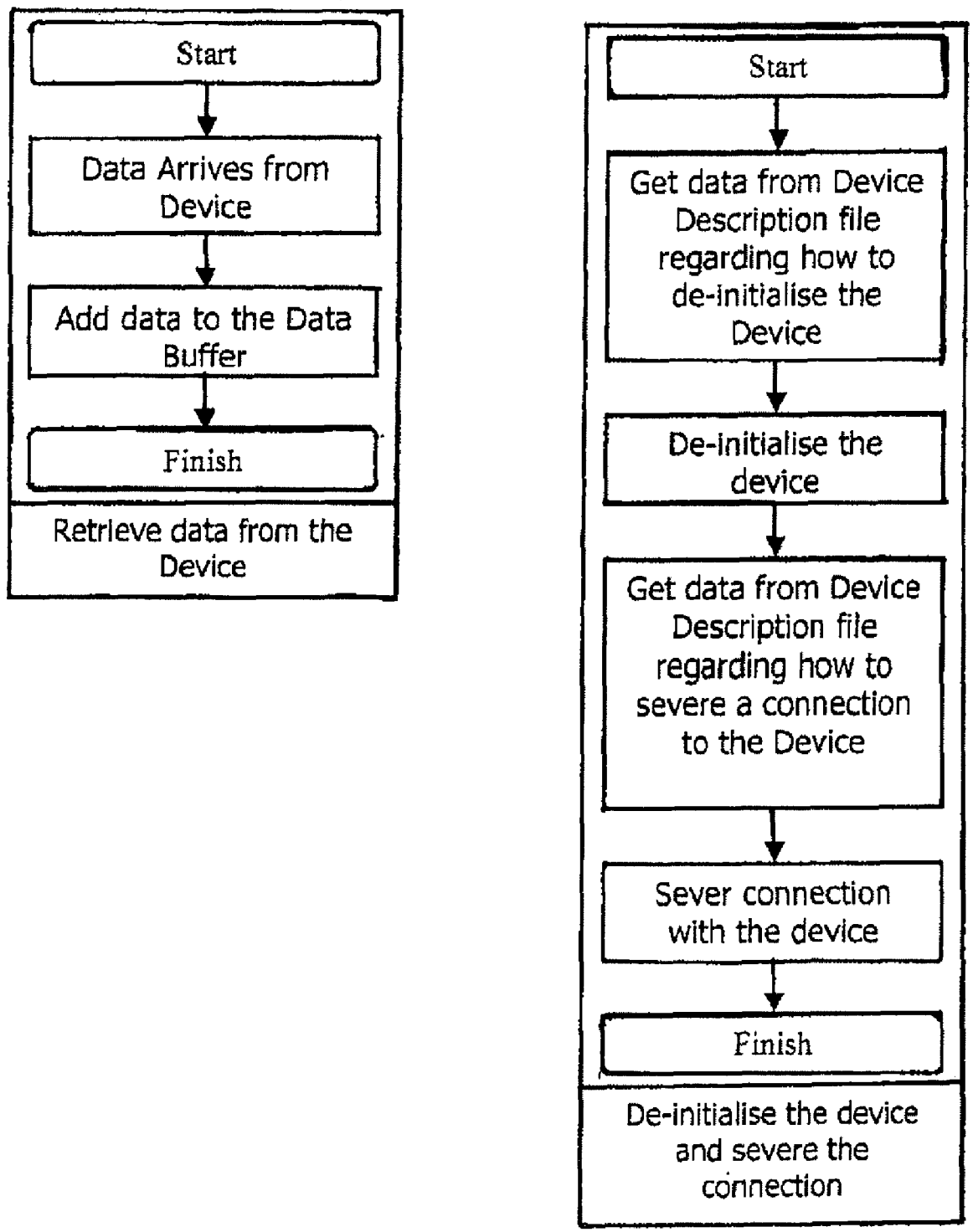

The role of the communicator 221 is four-fold. It performs the following distinct functions:
1. Establish a connection with the device and initialise the device
2. Send data to the device
3. Receive data from the device
4. De-initialise the device and severe the connection The basic workflows for each of the functions, assuming no errors, are shown in FIGS. 23 and 24.

The Communicator 221 follows a set of Communicator Rules 231 discussed below. The Device Description File specifies the device's connection type (which could be RS-232, USB, Bluetooth, or any other connection type). It also includes a list of the device's connection parameters. For the LDM for example, these include:

The connection type is RS-232.
COM Port number is 5
Baud-Rate is 9600 baud.
Number of data-bits is 8.
Number of stop bits is 1
Parity is set to "No Parity"
No Initialisation message is required
No De-initialisation message is required The purpose of the Data Buffer 222 is to allow the Communicator 221 to put data into a place where it can be read asynchronously by the Generic Parser 223. It has to be large enough so that there is no opportunity for buffer overrun due to:

The size of the received messages being too big
Data arriving to quickly before it can be processed Several different buffering techniques are applicable here. For example a circular buffer or a double buffer could be used.

Figure 25:
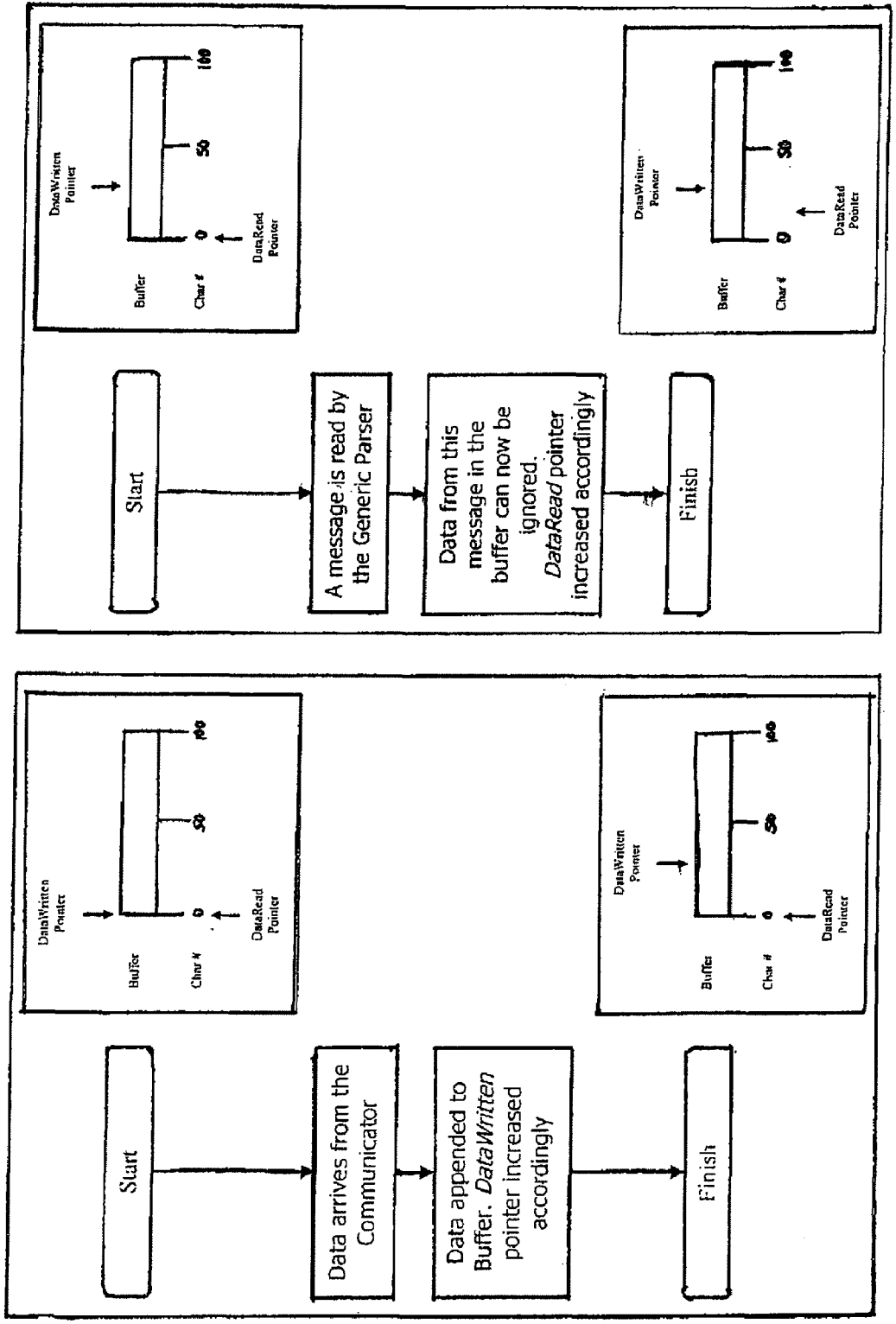
FIG. 25 shows two workflow diagrams involving the Data Buffer, namely the appending of data from the device into the buffer, and the reading and subsequent discarding of messages.

There are two key processes involving the Data Buffer. These are:

1. Appending of data from the device into the buffer
2. Reading and subsequent discarding of messages The two work flow diagrams shown in FIG. 25 illustrate these two processes, and the statuses of the buffer at each point.

The function of the Generic Parser 223 is to examine the Data Buffer between the two pointers DataWritten and DataRead, and to determine if there is a valid message therein. When it finds a message, the DataRead pointer is updated to the end of the message and the message is sent to the 'Reply Interpreter'.

Figure 26:
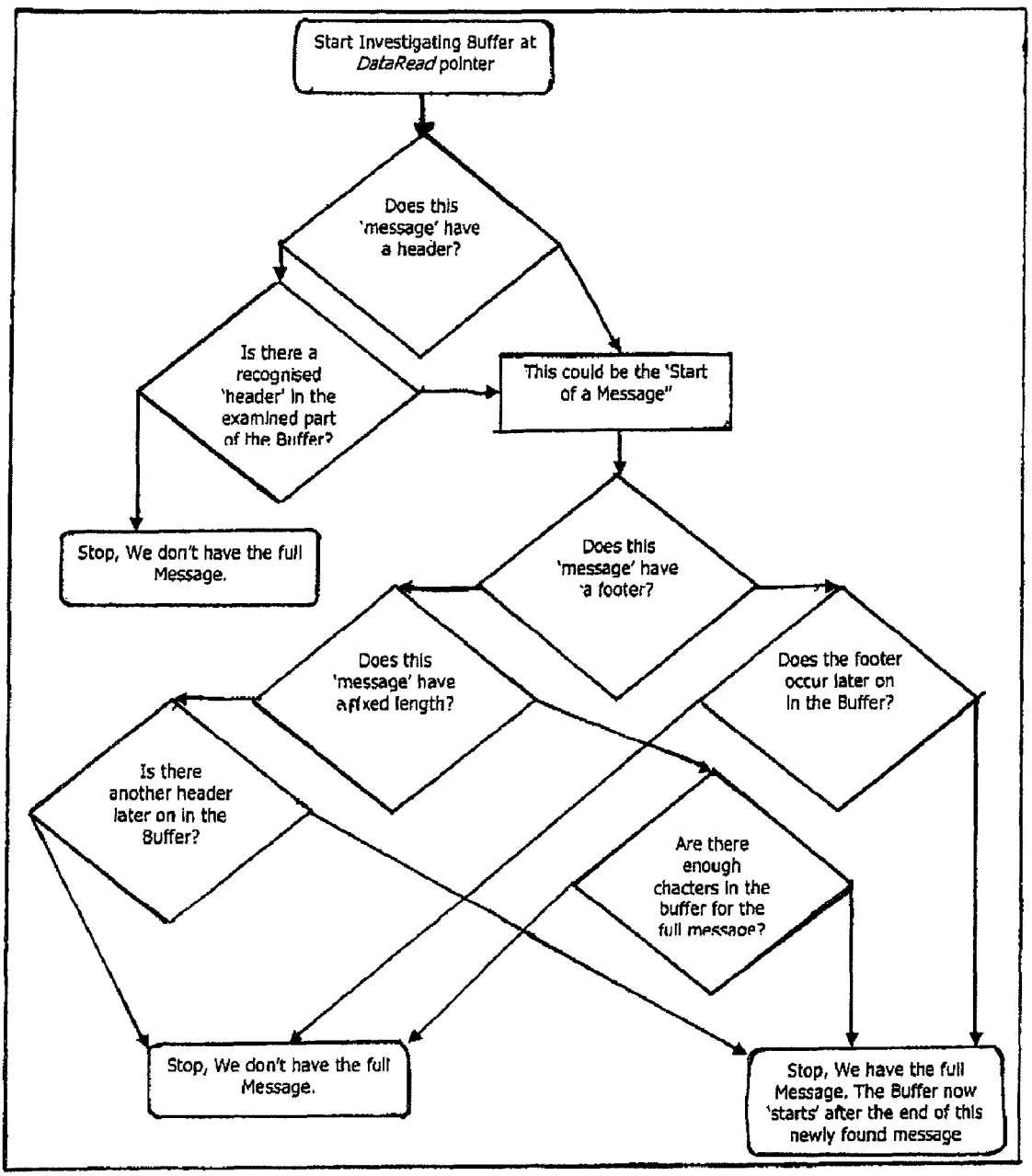
FIG. 26 shows the workflow of the Generic Parser.

The Generic Parser is run when either of the following conditions are met:

Every time 'x' milliseconds pass since the last execution
After every 'y' characters have arrived from the device The Generic Parse 223 has the work flow shown in FIG. 26.

The Generic Parser 223 follows Generic Parser rules 232 discussed below. For each type of reply that the Device Description File describes, the following information is required:

Does the reply have a known header format?
    If so, what is this?
Does the reply have a known footer format?
    If so, what is this?
Does the reply have a known fixed width?
    If so, what is this?
The headers and footers may contain certain 'regular expressions', as defined in the definitions.

Once the message has been identified by the Generic Parser 223, the data in it needs to be extracted. This is the job of the Reply Interpreter 224. The Reply Interpreter uses information pertaining to the message identified from the Device Description File to determine:

Where each data parameter starts and ends within the message
What data 'type' each parameter is When it has done this each parameter is put into an array of variant data type, and an event is raised in the application to say that data is ready and available for this message. The application can then retrieve this data from the variant array.

This Reply Interpreter only runs if the application writer 'wants' this information passed to the application; the application writer can configure the parser so that certain messages do not raise events in the application, or the event is only raised in the case of it being explicitly requested.

The data 'type' could be any of the following:
If the message parameter is in human readable ASCII format:
    Integer
    Long
    Single Precision
    Double Precision
    ASCII String
    Unicode String
If the message parameter has a binary format:
    1 bit
    2 bit unsigned Integer
    3 bit signed or unsigned Integer
    4 bit signed or unsigned Integer
    5 bit signed or unsigned Integer
    6 bit signed or unsigned Integer
    7 bit signed or unsigned Integer
    8 bit signed or unsigned Integer
    16 bit signed or unsigned Integer
    32 bit signed or unsigned Integer
    64 bit signed or unsigned Integer
    32 bit Floating Point (Single Precision)
    64 bit Double (Double Precision)
    ASCII String
    Unicode String These values are specified either as big or little endian.

The Reply Interpreter follows certain Reply Interpreter Rules 233. discussed below. For each parameter of each message, the Device Description File defines the following:

Is there a delimiter between parameters (such as a ',' used by a GPS?)
    If so, what is it? (regular expressions are allowed)
    Is there a different character before the first parameter?
        If so what is this? (regular expressions are allowed)
    Is there a different character after the last parameter?
        If so what is this? (regular expressions are allowed)
Is there a known place within the message that the parameter starts?
    If so, where is this?
Is the parameter a fixed length?
    If so, how long?
Does the parameter end in a known format?
    If so, what is this format? (regular expressions are allowed)
Does the parameter end at the end of the message?
What data type is the parameter?
Is the type is one of the types where 'endian' matters?
    Which 'endian' is the parameter?

The Device Description File 211 contains the rules for using the device. Broadly, this fits into four categories:

Connection type (e.g. IEEE 802.11b, RS-232) and associated parameters
Messages that can be sent to the device
How to identify messages that can be received from the device
Parameters within those messages The Device Description File lends itself to a hierarchical structure such as XML. A standard text file could also be used.

The connection type can be any of
RS-232
USB (1.0, 1.1 or 2.0)
Firewire

TCP/IP
Bluetooth
Any IEEE 802.11 standard
Any future connection

An example first line is: ConnectionType=RS-232

Next would follow the relevant parameters. For an RS-232 device this could be: BaudRate=9600, DataBits=8, StopBits=1, Parity="None"

For other connection types, parameters appropriate to those types would be defined. The second section has a list of messages that can be sent to the device. Each of these messages has an associated number and name, so a couple might be:

TxMessage ID=1, name="Reading", message="D[13]"
TxMessage ID=2, name="Status", message="X[13]"

The foregoing describes the invention including preferred forms thereof. Alterations and modifications as will be obvious to those skilled in the art are intended to be incorporated in the scope hereof as defined in the following claims.

The invention claimed is:

1. A mobile handheld device configured to capture an image of a target and spatial data for determination of a position of the target, the device including:
   i) one or more spatial sensors including:
      a) one or more orientation sensors configured to determine an orientation of the mobile device;
      b) a laser distance meter configured to determine a distance from the mobile device to a target; and
      c) a positioning system configured to determine a position of the mobile instrument; and
   ii) a viewing device including a camera for providing an image, a marker module configured to superimpose a marker indicative of a datum position on the image, and a display screen for displaying the image superimposed with the marker; the marker including a plurality of image elements including a first element, and a second element having a visual content which contrasts with a visual content of the first element; visual content including one or more of colour, brightness and tonal content; and the laser distance meter being aligned with the datum position; and
   iii) a processor configured to cause data to be captured substantially simultaneously from the spatial sensors and camera in response to a single user instruction to take a reading.

2. A device according to claim 1 wherein the first and second elements are adjacent, substantially straight, parallel lines.

3. A device according to claim 1 wherein the marker includes four or more lines which radiate from a common central region.

4. A device according to claim 1 wherein the elements are arranged in a line in an alternating pattern.

5. A device according to claim 1 wherein the first and second elements have different tonal content.

6. A device according to claim 1 wherein the first element is lighter than the second element.

7. A device according to claim 1 wherein the positioning system is a global positioning system (GPS) system.

8. A device according to claim 1 further including a tilt sensor for indicating a tilt of the device relative to a datum direction indicated by the marker.

9. A mobile device according to claim 1 configured to determine a position of the target from the position information, distance information and direction information.

10. A mobile device according to claim 1 configured to capture and store an image including the target.

11. A mobile device according to claim 1, the processor being configured to dynamically change the visual content of one or more of the first and second elements in accordance with the displayed image.

12. A device according to claim 2 wherein the marker includes four or more pairs of adjacent, substantially straight, parallel lines which radiate from a common central region.

13. A device according to claim 3 wherein the lines do not intersect at the common central region, whereby the image can be viewed in the central region.

14. A device according to claim 4 wherein the elements are arranged in two or more adjacent lines in a chequerboard pattern.

* * * * *